US008605755B2

(12) United States Patent
Bedingfield et al.

(10) Patent No.: US 8,605,755 B2
(45) Date of Patent: *Dec. 10, 2013

(54) METHODS, SYSTEMS, AND DEVICES FOR BANDWIDTH CONSERVATION

(71) Applicant: AT&T Intellectual Property I, L.P., Atlanta, GA (US)

(72) Inventors: James C. Bedingfield, Atlanta, GA (US); Henry Kafka, Atlanta, GA (US); Eric Small, Dallas, TX (US); Daniel Baeza, Coral Springs, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,747

(22) Filed: Nov. 14, 2012

(65) Prior Publication Data

US 2013/0073734 A1    Mar. 21, 2013

Related U.S. Application Data

(63) Continuation of application No. 11/300,061, filed on Dec. 14, 2005, now Pat. No. 8,335,239.

(60) Provisional application No. 60/667,018, filed on Mar. 31, 2005.

(51) Int. Cl.
H04H 60/33        (2008.01)
(52) U.S. Cl.
USPC ............................................. 370/477; 725/10
(58) Field of Classification Search
None
See application file for complete search history.

(56) References Cited

U.S. PATENT DOCUMENTS

| 4,017,676 | A |   | 4/1977  | Rabeler et al. |
| 4,380,687 | A |   | 4/1983  | Stewart |
| 4,439,784 | A |   | 3/1984  | Furukawa et al. |
| 4,769,697 | A |   | 9/1988  | Gilley et al. |
| 4,802,022 | A |   | 1/1989  | Harada |
| 4,903,130 | A |   | 2/1990  | Kitagawa et al. |
| 4,907,079 | A |   | 3/1990  | Turner et al. |
| 5,255,180 | A |   | 10/1993 | Shinoda et al. |
| 5,278,654 | A |   | 1/1994  | Yang |
| 5,313,282 | A |   | 5/1994  | Hayashi |
| 5,331,354 | A |   | 7/1994  | Koyama et al. |
| 5,731,764 | A |   | 3/1998  | Tanaka |
| 5,793,409 | A |   | 8/1998  | Tetsumura |
| 5,844,600 | A | * | 12/1998 | Kerr ........................... 348/14.12 |
| 5,874,986 | A |   | 2/1999  | Gibbon et al. |

(Continued)

FOREIGN PATENT DOCUMENTS

| WO | 03058478 A1   | 7/2003 |
| WO | 2005076617 A1 | 8/2005 |

OTHER PUBLICATIONS

U.S. Appl. No. 11/300,062, filed Dec. 14, 2005.
U.S. Appl. No. 11/300,125, filed Dec. 14, 2005.

(Continued)

*Primary Examiner* — Hassan Kizou
*Assistant Examiner* — Roberta A Shand
(74) *Attorney, Agent, or Firm* — Cantor Colburn LLP

(57) ABSTRACT

Methods, systems, and devices are disclosed for conserving bandwidth. If a presence of a multimedia device is detected, then a stream of data is delivered to the multimedia device. If the presence of the multimedia device is not detected, then the stream of data is degraded to conserve bandwidth.

20 Claims, 18 Drawing Sheets

(56) References Cited

U.S. PATENT DOCUMENTS

| | | | |
|---|---|---|---|
| 5,892,856 A | 4/1999 | Cooper et al. | |
| 5,892,859 A | 4/1999 | Grote | |
| 5,995,153 A | 11/1999 | Moeller et al. | |
| 6,014,694 A | 1/2000 | Aharoni et al. | |
| 6,025,869 A | 2/2000 | Stas et al. | |
| 6,052,734 A | 4/2000 | Ito et al. | |
| 6,057,872 A | 5/2000 | Candelore | |
| 6,078,589 A | 6/2000 | Kuechler | |
| 6,147,992 A | 11/2000 | Giroir et al. | |
| 6,177,931 B1 | 1/2001 | Alexander et al. | |
| 6,216,956 B1 | 4/2001 | Ehlers et al. | |
| 6,237,022 B1 | 5/2001 | Bruck et al. | |
| 6,240,460 B1 | 5/2001 | Mitsutake et al. | |
| 6,260,111 B1 | 7/2001 | Craig et al. | |
| 6,315,668 B1 | 11/2001 | Metke et al. | |
| 6,324,182 B1 | 11/2001 | Burns et al. | |
| 6,400,687 B1 | 6/2002 | Davison et al. | |
| 6,480,753 B1 | 11/2002 | Calder et al. | |
| 6,591,423 B1 | 7/2003 | Campbell | |
| 6,594,826 B1 | 7/2003 | Rao et al. | |
| 6,609,253 B1 * | 8/2003 | Swix et al. | 725/88 |
| 6,631,118 B1 | 10/2003 | Jones | |
| 6,647,411 B2 | 11/2003 | Towell et al. | |
| 6,717,507 B1 | 4/2004 | Bayley et al. | |
| 6,741,563 B2 | 5/2004 | Packer | |
| 6,757,796 B1 | 6/2004 | Hofmann | |
| 6,771,661 B1 | 8/2004 | Chawla et al. | |
| 6,796,787 B2 | 9/2004 | Okada | |
| 6,810,528 B1 | 10/2004 | Chatani | |
| 6,816,903 B1 | 11/2004 | Rakoshitz et al. | |
| 6,839,052 B1 | 1/2005 | Kramer | |
| 6,870,463 B2 | 3/2005 | Dresti et al. | |
| 6,889,382 B1 * | 5/2005 | Anderson | 725/10 |
| 6,961,341 B1 | 11/2005 | Krishnan | |
| 6,973,066 B2 | 12/2005 | Gutowski | |
| 7,000,246 B1 | 2/2006 | Takao | |
| 7,065,586 B2 | 6/2006 | Ruttenberg et al. | |
| 7,151,939 B2 | 12/2006 | Sheynblat | |
| 7,277,379 B2 | 10/2007 | Kondo et al. | |
| 7,277,894 B2 | 10/2007 | Kondo | |
| 7,284,201 B2 | 10/2007 | Cohen-Solal | |
| 7,437,073 B2 | 10/2008 | Kim et al. | |
| 7,512,650 B2 | 3/2009 | Richardson | |
| 7,519,703 B1 | 4/2009 | Stuart et al. | |
| 2001/0031633 A1 | 10/2001 | Tuomela et al. | |
| 2001/0043571 A1 | 11/2001 | Jang et al. | |
| 2002/0002708 A1 | 1/2002 | Arye | |
| 2002/0018645 A1 | 2/2002 | Nakamatsu et al. | |
| 2002/0046099 A1 | 4/2002 | Frengut et al. | |
| 2002/0080721 A1 | 6/2002 | Tobagi et al. | |
| 2002/0083443 A1 | 6/2002 | Eldering et al. | |
| 2002/0104087 A1 | 8/2002 | Schaffer et al. | |
| 2002/0108127 A1 | 8/2002 | Lew et al. | |
| 2002/0133830 A1 | 9/2002 | Kim et al. | |
| 2002/0144259 A1 | 10/2002 | Gutta et al. | |
| 2002/0164987 A1 | 11/2002 | Caronni et al. | |
| 2002/0178440 A1 | 11/2002 | Agnihotri et al. | |
| 2002/0194586 A1 | 12/2002 | Gutta et al. | |
| 2003/0002642 A1 | 1/2003 | Jorasch et al. | |
| 2003/0002862 A1 | 1/2003 | Rodriguez et al. | |
| 2003/0004743 A1 | 1/2003 | Callegari | |
| 2003/0028872 A1 | 2/2003 | Milovanovic et al. | |
| 2003/0046704 A1 | 3/2003 | Laksono et al. | |
| 2003/0061619 A1 | 3/2003 | Giammaressi | |
| 2003/0067554 A1 | 4/2003 | Klarfeld et al. | |
| 2003/0088878 A1 | 5/2003 | Rogers et al. | |
| 2003/0118029 A1 | 6/2003 | Maher, III et al. | |
| 2003/0135544 A1 | 7/2003 | Richardson | |
| 2003/0154242 A1 | 8/2003 | Hayes et al. | |
| 2003/0154246 A1 | 8/2003 | Ollikainen | |
| 2003/0236745 A1 | 12/2003 | Hartsell et al. | |
| 2004/0009761 A1 | 1/2004 | Money et al. | |
| 2004/0013119 A1 | 1/2004 | MeLampy et al. | |
| 2004/0071085 A1 | 4/2004 | Shaham et al. | |
| 2004/0078814 A1 | 4/2004 | Allen | |
| 2004/0125757 A1 | 7/2004 | Mela et al. | |
| 2004/0183749 A1 | 9/2004 | Vertegaal | |
| 2004/0221304 A1 | 11/2004 | Sparrell et al. | |
| 2004/0226034 A1 | 11/2004 | Kaczowka et al. | |
| 2004/0255336 A1 | 12/2004 | Logan et al. | |
| 2004/0264563 A1 * | 12/2004 | Inoue et al. | 375/240.01 |
| 2004/0266407 A1 | 12/2004 | Lee et al. | |
| 2004/0268407 A1 | 12/2004 | Sparrell et al. | |
| 2004/0268410 A1 | 12/2004 | Barton et al. | |
| 2005/0002662 A1 | 1/2005 | Arpa et al. | |
| 2005/0007965 A1 | 1/2005 | Hagen et al. | |
| 2005/0022239 A1 | 1/2005 | Meuleman | |
| 2005/0024543 A1 | 2/2005 | Ramaswamy et al. | |
| 2005/0039219 A1 | 2/2005 | Cooper et al. | |
| 2005/0066026 A1 | 3/2005 | Chen et al. | |
| 2005/0081252 A1 | 4/2005 | Chefalas et al. | |
| 2005/0097595 A1 * | 5/2005 | Lipsanen et al. | 725/25 |
| 2005/0108328 A1 * | 5/2005 | Berkeland et al. | 709/204 |
| 2005/0120113 A1 | 6/2005 | Bunch et al. | |
| 2005/0144640 A1 * | 6/2005 | Fritsch et al. | 725/58 |
| 2005/0183110 A1 | 8/2005 | Anderso | |
| 2005/0266825 A1 | 12/2005 | Clayton | |
| 2006/0013266 A1 | 1/2006 | Vega-Garcia et al. | |
| 2006/0025151 A1 * | 2/2006 | Karaoguz et al. | 455/455 |
| 2006/0028185 A1 | 2/2006 | Hernandez et al. | |
| 2006/0056389 A1 | 3/2006 | Monk et al. | |
| 2006/0095398 A1 * | 5/2006 | Bhaskaran | 707/1 |
| 2006/0114360 A1 | 6/2006 | Kortum et al. | |
| 2006/0125959 A1 | 6/2006 | Yoshizawa et al. | |
| 2006/0174266 A1 | 8/2006 | Gatto et al. | |
| 2006/0179466 A1 | 8/2006 | Pearson et al. | |
| 2006/0184780 A1 | 8/2006 | Yamada et al. | |
| 2006/0195866 A1 | 8/2006 | Thukral | |
| 2006/0204214 A1 | 9/2006 | Shah et al. | |
| 2006/0221826 A1 | 10/2006 | Bedingfield et al. | |
| 2006/0222015 A1 | 10/2006 | Kafka et al. | |
| 2006/0222110 A1 | 10/2006 | Kuhtz | |
| 2006/0225106 A1 | 10/2006 | Bedingfield | |
| 2006/0251116 A1 | 11/2006 | Bedingfield | |
| 2007/0133603 A1 | 6/2007 | Weaver et al. | |
| 2007/0136772 A1 | 6/2007 | Weaver et al. | |
| 2007/0169142 A1 | 7/2007 | Claassen et al. | |

OTHER PUBLICATIONS

U.S. Appl. No. 11/300,212, filed Dec. 14, 2005.

"The Cutting Edge of RFID Technology and Application for Manufacturing and Distribution", Texas Instrument TIRIS, Apr. 16, 2004, retrieved from http://www.ti.com/rfid/docs/manuels/whrPapers/manuf_dist.pdf, pp. 1-13.

"Baggage Direct-Uses Tag-It, The World's First RFID-based Baggage Delivery System", Nov. 2000, Texas Instruments, 12 pages.

* cited by examiner

METHODS, SYSTEMS, AND DEVICES FOR BANDWIDTH CONSERVATION

CROSS-REFERENCE TO RELATED APPLICATIONS AND PRIORITY CLAIM

This application is a continuation of and claims priority to U.S. Non-Provisional application Ser. No. 11/300,061, entitled "METHODS, SYSTEMS, AND DEVICES FOR BANDWIDTH CONSERVATION", filed Dec. 14, 2005, which claims benefit of U.S. Provisional Patent Application 60/667,018, filed Mar. 31, 2005, entitled "METHODS AND SYSTEMS FOR PROVIDING VIDEO/TELEVISION SERVICES OVER A DIGITAL SUBSCRIBER LINE", all of which are incorporated herein by reference in their entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to interactive multimedia distribution systems and, more particularly, to presence detection and degradation in such systems.

Bandwidth is becoming a problem in the communications industry. As subscribers demand more and more content, higher definition services, interactive services, and data services, the existing network infrastructure has trouble supplying adequate bandwidth. The industry is hard at work identifying new ways of increasing bandwidth. The industry is also striving to reduce wasted bandwidth.

An "always on" set-top box is one example of wasted bandwidth. An "always on" set-top box continually receives content, even while no one is watching television. When the set-top box remains powered "on" and tuned to a channel, the set-top box consumes bandwidth. Often times, however, that channel is not watched and bandwidth is wasted. Many cable subscribers, for example, forget to, or are unable to, turn "off" their set-top box. Many subscribers power "off" the television, yet the set-top box remains powered "on" and receiving content. It's not uncommon for a set-top box to continually receive a video stream while the subscriber sleeps for hours and/or vacations for days. No one is watching the content, yet the set-top box is consuming three megabits or more per second of network bandwidth. This consumption may not be a significant problem in a broadcast network (such as a cable network). In a more focused delivery of content (such as in a multicast or unicast network), however, this consumption reduces the efficiency of the network. This consumption is not only a concern in shared networks (such as a broadband communications networks), but this consumption is also a concern for the subscriber's residential network. As digital content becomes more prevalent, the subscriber will maintain a residential network in their home, and bandwidth usage is important for efficient utilization of this residential network. Because both broadband communications networks and subscribers' residential networks need to efficiently utilize bandwidth, there is a need in the art for reducing bandwidth consumption while still preserving session connections.

SUMMARY

The aforementioned problems, and other problems, are reduced, according to exemplary embodiments, by methods, systems, and devices that conserve bandwidth in communications networks. These exemplary embodiments describe how a multimedia service provider can reduce the occurrences of wasted bandwidth while still maintaining a session connection. These exemplary embodiments minimize bandwidth consumption of an established session by detecting the presence of a multimedia device. If the multimedia device is present, then the exemplary embodiments deliver a stream of data to that multimedia device, and a bit rate of the stream of data is appropriate to the needs of the multimedia device. If, however, the multimedia device is not present, then there is little or no need for a full-resolution feed to the multimedia device. The exemplary embodiments, instead, degrade the stream of data to conserve bandwidth in the network. The degraded stream of data still preserves an established data session, yet the degraded stream of data has a reduced bit rate to reduce bandwidth consumption. When the multimedia device is again detected and present, then the exemplary embodiments restore the stream of data to its full-resolution data rate. The bit rate of the data stream, therefore, can be appropriate to the needs of the consuming device.

The exemplary embodiments conserve bandwidth. If the presence of a multimedia device is detected, then a stream of data may be delivered to that multimedia device. If, however, the presence of the multimedia device is not detected, then the stream of data may be degraded to conserve bandwidth.

The exemplary embodiments also include a device that conserves bandwidth. The device comprises a processor communicating with means for detecting presence of a multimedia device. The processor commands delivery of a stream of data to the multimedia device. If the presence of the multimedia device is not detected, then the processor degrades the stream of data to conserve bandwidth.

The exemplary embodiments also include a computer program product for conserving bandwidth. The computer program product comprises a computer-readable medium and a presence detection application stored on the computer-readable medium. The presence detection application comprises computer code for performing the steps: i) if a presence of a multimedia device is detected, then delivering a stream of data to the multimedia device; and ii) if the presence of the multimedia device is not detected, then degrading the stream of data to conserve bandwidth.

Other systems, methods, and/or devices according to the exemplary embodiments will be or become apparent to one with skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments now will be described more fully hereinafter with reference to the accompanying drawings. The reader should recognize, however, that the exemplary embodiments may be embodied in many different forms and should not be construed as limited to the embodiments set forth herein. These embodiments are provided so that this disclosure will be thorough and complete and will fully convey the scope of the exemplary embodiments. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods of the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

The exemplary embodiments describe methods, systems, and devices that conserve bandwidth in a communications network. The exemplary embodiments may also be applied to conserving bandwidth in a local-area network (LAN) and in a wide-area network (WAN). These exemplary embodiments describe how a multimedia service provider can reduce the occurrences of wasted bandwidth. The exemplary embodiments detect the presence of a multimedia device receiving a stream of data. If the multimedia device is present, then the exemplary embodiments deliver a full-resolution version of the stream of data to that multimedia device. If, however, the multimedia device is not present, then there is little or no need for a full-resolution feed to the multimedia device. The exemplary embodiments, instead, degrade the stream of data to conserve bandwidth in the network. When the multimedia device is again detected and present, then the exemplary embodiments restore the stream of data to its full-resolution data rate.

Figure 1:
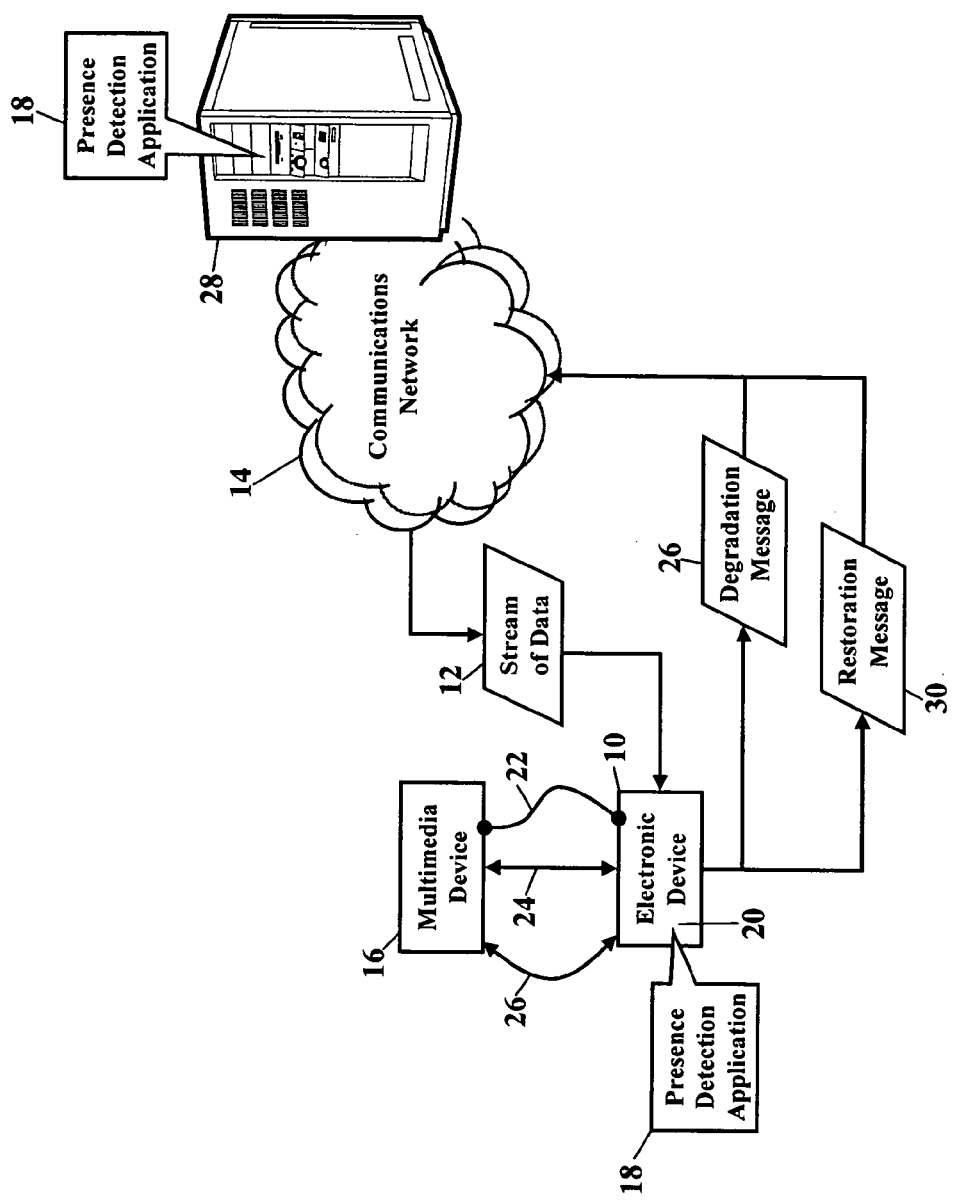
FIG. 1 is a simplified schematic illustrating an operating environment according to exemplary embodiments.

FIG. 1 is a simplified schematic illustrating an operating environment according to exemplary embodiments. FIG. 1 shows an electronic device 10 receiving a stream 12 of data via a communications network 14. The electronic device 10 can be any device, such as a set-top box, a television, or an integrated television and set-top box. The electronic device 10 may also be an analog/digital recorder, CD/DVD player/recorder, audio equipment, receiver, tuner, and/or any other consumer electronic device. The electronic device 10 may also include any computer, peripheral device, camera, modem, storage device, telephone, personal digital assistant, and/or mobile phone. The stream 12 of data may be any RF and/or digital content, such as television/cable programming, mpg streams, or any other content. The communications network 14 may be a cable network operating in the radio-frequency domain and/or the Internet Protocol (IP) domain. The communications network 14, however, may also include a distributed computing network, such as the Internet (sometimes alternatively known as the "World Wide Web"), an intranet, a local-area network (LAN), and/or a wide-area network (WAN). The communications network 14 may include coaxial cables, copper wires, fiber optic lines, and/or hybrid-coaxial lines. The communications network 14 may even include wireless portions utilizing any portion of the electromagnetic spectrum and any signaling standard (such as the IEEE 802 family of standards).

As FIG. 1 shows, the electronic device 10 also detects or monitors the presence of a multimedia device 16. A presence detection application 18 is a computer program that monitors the presence of the multimedia device 16. The presence detection application 18 stores in memory 20 of the electronic device 10 and monitors or detects when the multimedia device 16 is present, or communicating with, the electronic device 10. If the multimedia device 16 receives electrical power 22 from the electronic device 10, then the presence detection application 18 may monitor a state of the multimedia device 16, such as an electrically-powered "on" or "off" state. The presence detection application 18, for example, may measure electrical power consumption of the multimedia device 16. If the electronic device 10 delivers a video output signal 24 to the multimedia device 16, then the presence detection application 18 may measure an impedance change in the video output signal 24. The presence detection application 18 may alternatively or additionally monitor a communication link 26 between the electronic device 10 and the multimedia device 16. If the presence detection application 18 detects a successful communication between the electronic device 10 and the multimedia device 16, then the multimedia device 16 may be present. The presence detection application 18 may additionally or alternatively measure any current, voltage, resistance, electromagnetic field, or frequency to determine the presence of the multimedia device 16. Because presence detection is known to those of ordinary skill in the art, presence detection will not be further described. If the reader desires a more detailed explanation of presence detection, the reader is directed to the following sources: U.S. Pat. No. 4,903,130 to Kitagawa et al. (Feb. 20, 1990); U.S. Pat. No. 5,255,180 to Shinoda et al. (Oct. 19, 1993); U.S. Pat. No. 5,313,282 to Hayashi (May 17, 1994); U.S. Pat. No. 5,331,354 to Koyama et al. (Jul. 19, 1994); U.S. Pat. No. 5,731,764 to Tanaka (Mar. 24, 1998); U.S. Pat. No.

6,078,589 to Kuechler (Jun. 20, 2000); U.S. Pat. No. 6,591,423 to Campbell (Jun. 8, 2003); U.S. Pat. No. 6,870,463 to Dresti et al. (Mar. 22, 2005); and published U.S. Patent Application 2004/0268407 to Sparrell et al. (Dec. 30, 2004), with each incorporated herein by reference in their entirety.

The multimedia device 16 may itself be any electronic device. The electronic device 10 and the multimedia device 16 may have a master-slave relationship, a peripheral relationship, or a component relationship. The multimedia device 16 may itself be a set-top box, a television, or an integrated television and set-top box. The multimedia device 16 may also be an analog/digital recorder, CD/DVD player/recorder, audio equipment, receiver, tuner, and/or any other consumer electronic device. The multimedia device 16 may also include any computer, peripheral device, camera, modem, storage device, telephone, personal digital assistant, and/or mobile phone.

The presence detection application 18 helps conserve bandwidth. The presence detection application 18 determines when high bandwidth need not be allocated to the electronic device 10 and/or to the multimedia device 16. If the presence detection application 18 cannot detect the presence of the multimedia device 16, then there is no need to communicate a high-bandwidth stream 12 of data from the communications network 14. As the following paragraphs will explain, when the presence of the multimedia device 16 cannot be detected, the presence detection application 18 causes degradation in the stream 12 of data. The presence detection application 18 sends a degradation message 26 to a server 28. The stream 12 of data is sent by the server 28, and the degradation message 26 instructs a corresponding component of the presence detection application 18 to degrade the stream 12 of data. Because the stream 12 of data is degraded, bandwidth is conserved. When the presence of the multimedia device 16 is subsequently detected, then the presence detection application 18 causes a restoration in the data rate (e.g., bytes per second) of stream 12 of data. The presence detection application 18 sends a restoration message 30 to the server 28, and the restoration message 30 instructs the server 28 to restore the data rate of the stream 12 of data.

Figure 2:
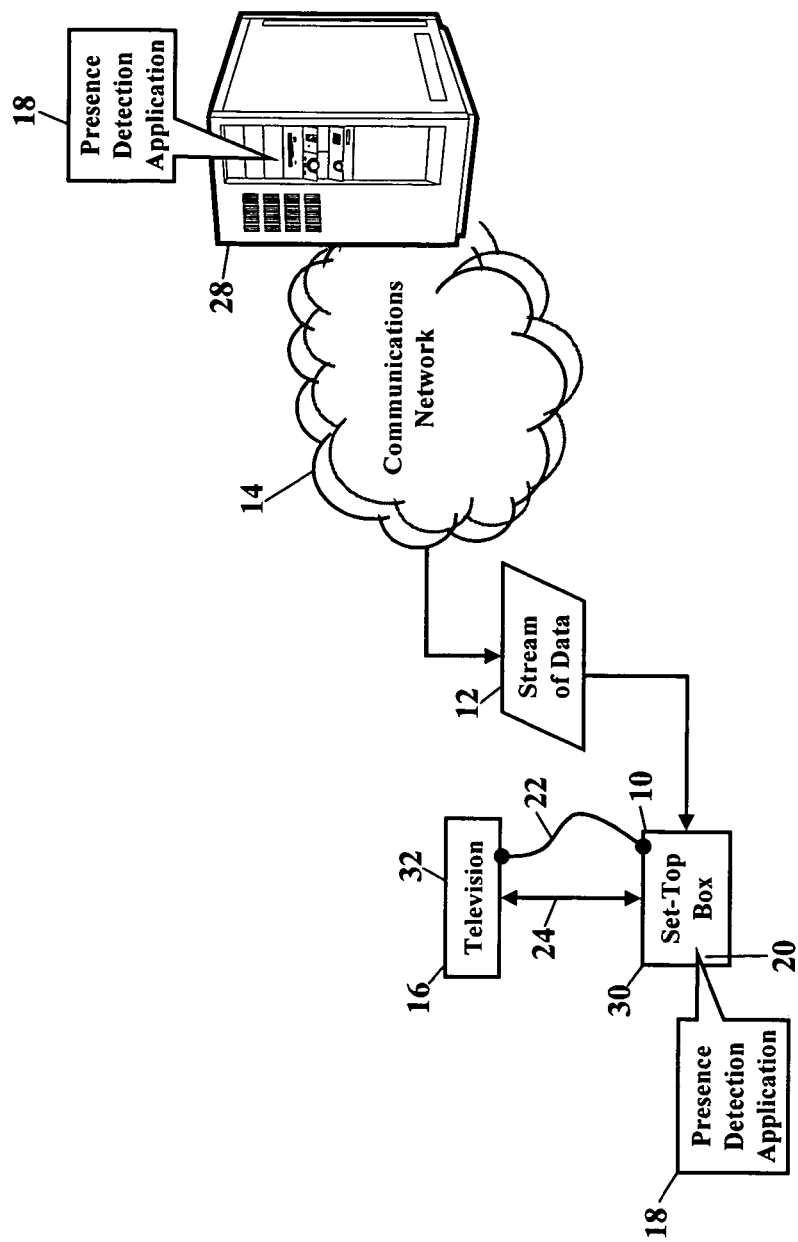
FIGS. 2-6 are schematics illustrating presence detection, degradation, and restoration according to exemplary embodiments.

FIGS. 2-6 provide an example. FIGS. 2-6 are schematics illustrating presence detection, degradation, and restoration according to exemplary embodiments. FIG. 2 shows the electronic device 10 receiving the stream 12 of data via the communications network 14. Although the electronic device 10 may be any device, here the electronic device 10 is shown as a set-top box 30. FIG. 2 also shows the set-top box 30 interfacing with the multimedia device 16. Although the multimedia device 16 may also be any device, the multimedia device 16 is shown as a television 32. The presence detection application 18, in this example, measures the electrical power consumed by the television 32, as illustrated by the power cord 22. Because the measured electrical power indicates the television 32 is present, the presence detection application 18 makes no change in the data rate of the stream 12 of data. The presence detection application 18, operating in the server 28, delivers the stream 12 of data at its full resolution, whatever that full resolution may be.

Figure 3:
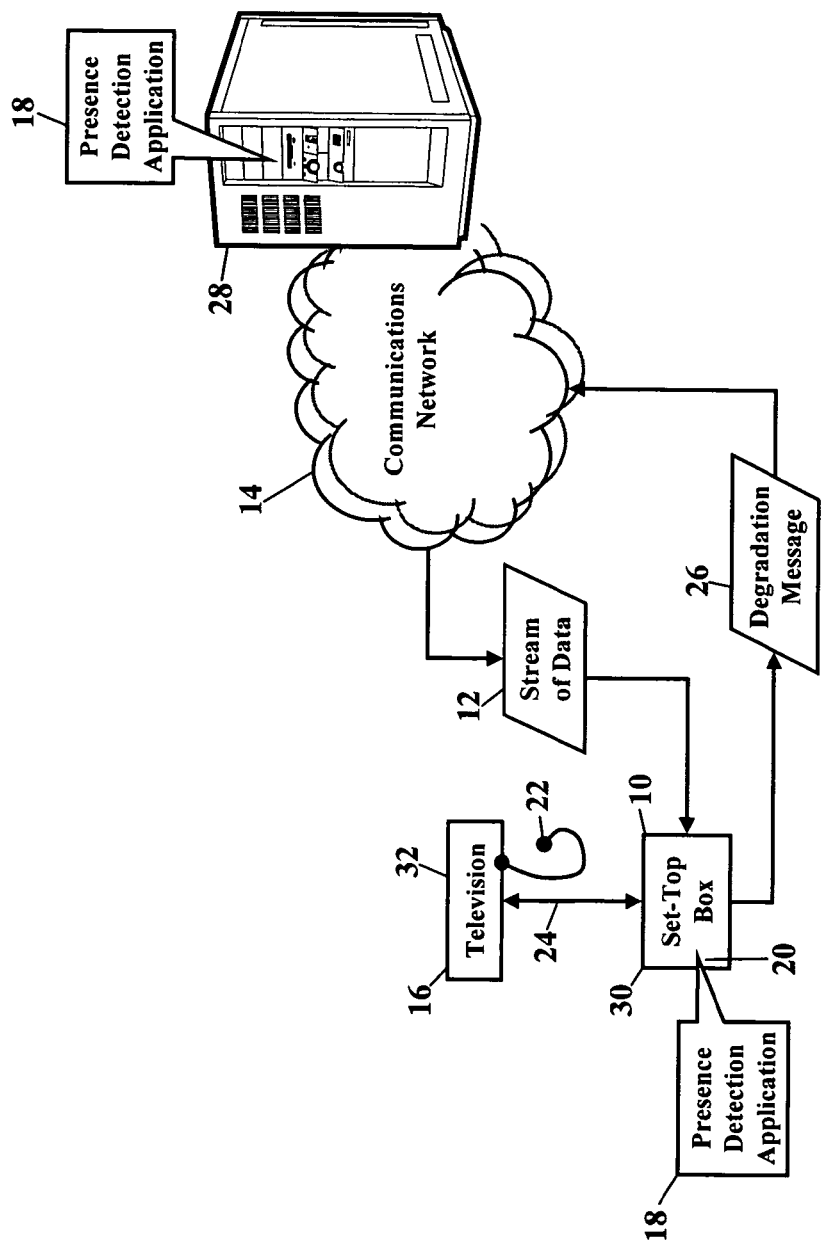

FIG. 3, however, illustrates transmission of the degradation message 26. When the monitored electrical power of the television 32 falls below some threshold value, this reduced power consumption indicates the television 32 is not present. Suppose, for example, the television 32 is not powered "on" or, as FIG. 3 illustrates, the power cord 22 is unplugged from an auxiliary outlet on the set-top box 30. The presence detection application 18 (operating in the set-top box 30) notices that the consumed electrical power has dropped below the threshold value, indicating the television 32 is no longer present. Because the television is not present, there is no need to send a full-resolution version of the stream 12 of data.

The presence detection application 18, operating in the set-top box 30, sends the degradation message 26 to the server 28. The presence detection application 18 sends the degradation message 26 to the server 28 via the communications network 14. The degradation message 26 instructs the corresponding server-based component of the presence detection application 18 to degrade the stream 12 of data.

Figure 4:
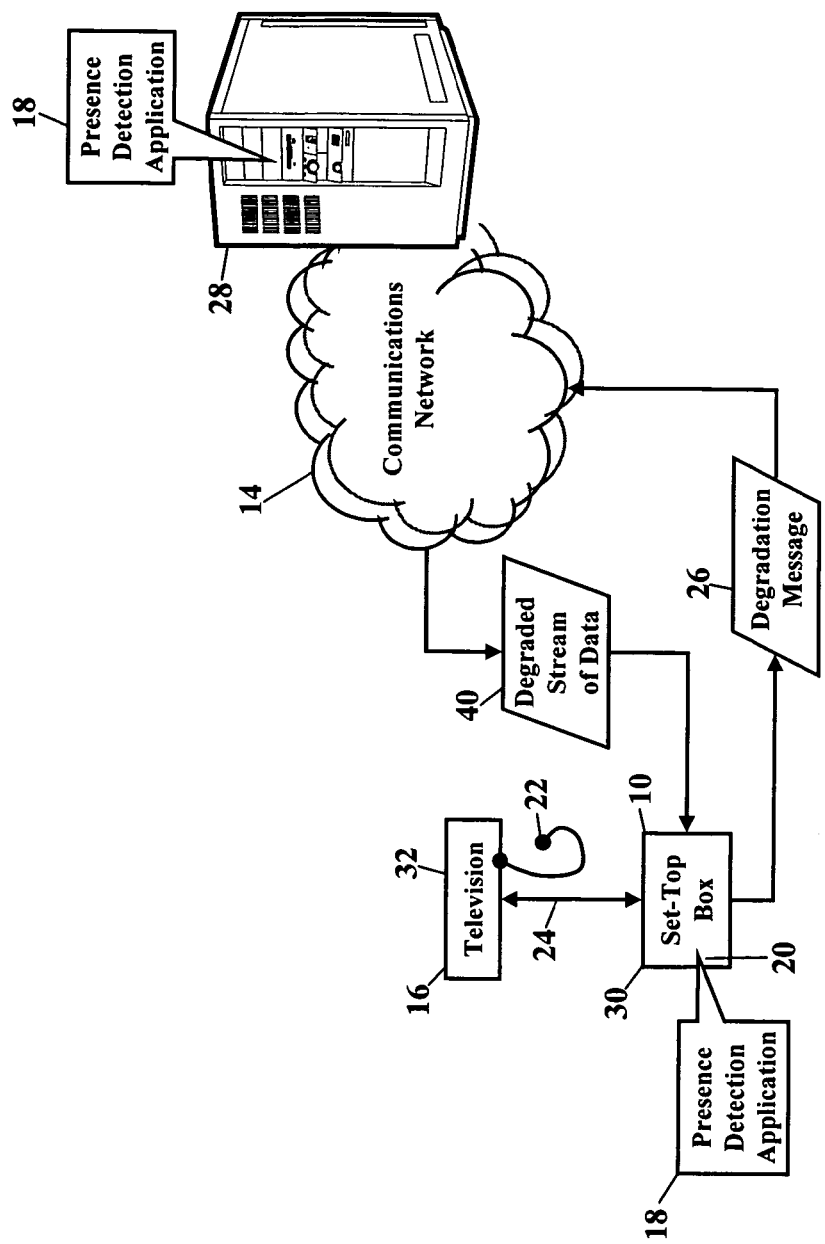

FIG. 4 is a schematic illustrating transmission of a degraded stream 40 of data, according to exemplary embodiments. The presence detection application 18, operating in the server 28, receives the degradation message 26. The degradation message 26 instructs the corresponding server-based presence detection application 18 to degrade the stream of data (shown as reference numeral 12 in FIGS. 1-3). As FIG. 4 illustrates, a degraded stream 40 of data is then processed and sent from the server 28 and to the set-top box 30. The degraded stream 40 of data has a reduced data rate measured in bytes per second. Because the degraded stream 40 of data has a reduced data rate, the bandwidth allocated to the set-top box 30 may be reduced and reallocated to other uses within the communications network 14.

Figure 5:
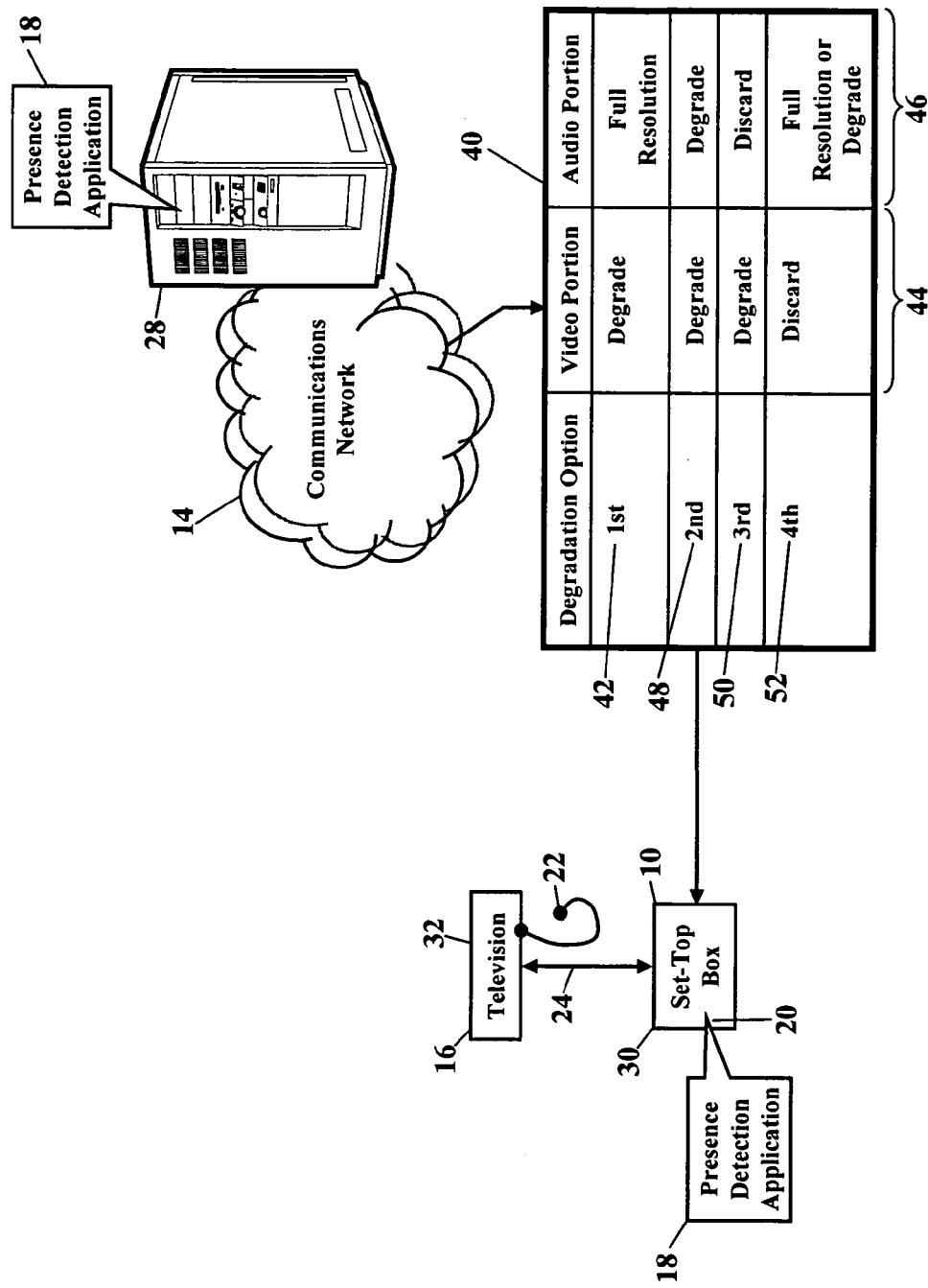

FIG. 5 shows a table illustrating the degraded stream 40 of data, according to exemplary embodiments. The degraded stream 40 of data includes the original audio and video components of the full-resolution stream of data (shown as reference numeral 12 in FIGS. 1-3), but the presence detection application 18 commands or produces degradation of either or both portions to conserve bandwidth. As FIG. 5 illustrates, a first degradation option 42 degrades a video portion 44, but an audio portion 46 is not degraded. The first degradation option may result in a smaller picture and/or a black-and-white picture, but with full-resolution sound quality. A second degradation option 48 degrades both the video portion 44 and the audio portion 46. The second degradation option 48 may result in a similar picture quality to the first degradation option 42, but the sound quality may be degraded to monophonic or less. A third degradation option 50 degrades the video portion 44 and discards the audio portion 46, producing a silent version of a degraded picture. A fourth degradation option 52 discards the video portion 44 and delivers only the audio portion 46. The fourth degradation option 52 may conserve the most bandwidth, producing an audio-only version of the original stream of data (shown as reference numeral 12 in FIGS. 1-3). A fifth degradation option (not shown) could discard or degrade the audio portion and deliver only the full-resolution video portion. Although this fifth option is possible, it conserves the least bandwidth. Because the audio portion 46 is relatively small when compared to the video portion 44, delivering only the full-resolution video portion would not appreciably conserve bandwidth. These various modes may be appropriate when one device serves multiple devices, e.g., a television and a sound system. Some of these multiple devices maintain the session but do not require a full-bandwidth session.

Because the fourth degradation option 52 may conserve the most bandwidth, the fourth degradation option 52 is a default. That is, unless the presence detection application 18 is otherwise configured, the presence detection application 18 automatically discards the video portion 44 and delivers only the audio portion 46. When the presence detection application 18 no longer detects presence of the television 32, the presence detection application 18 degrades data rates to conserve bandwidth. The set-top box 30 thus receives an audio-only version of the original stream of data (shown as reference numeral 12 in FIGS. 1-3). The audio portion 46 may be full resolution, or the audio portion 46 may be degraded to further conserve bandwidth. So, even though the television 32 is powered "off," but the set-top box 30 remains powered "on," a low-bandwidth audio-only signal is communicated to the "always on" set-top box 30.

Figure 6:
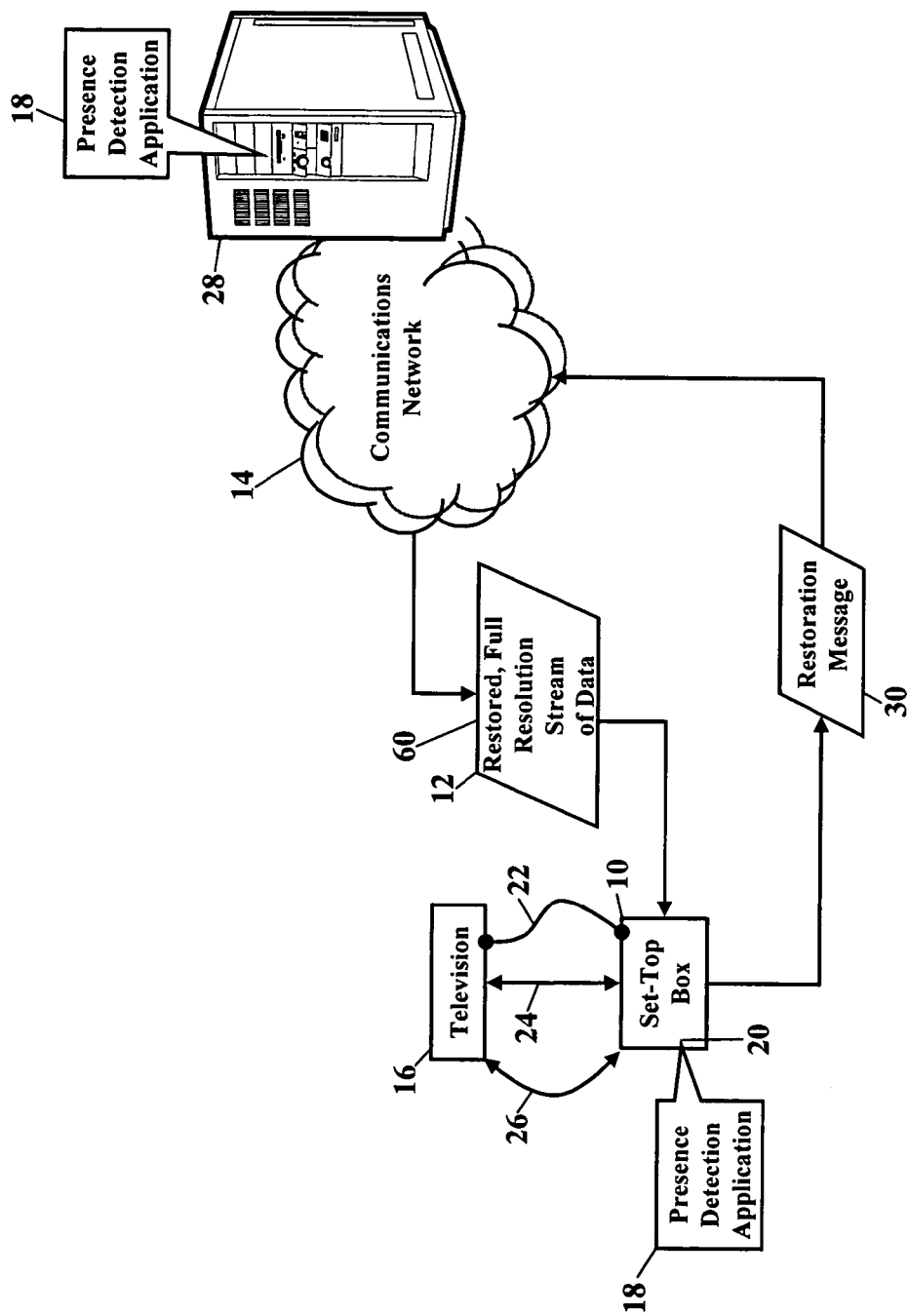

FIG. 6 is a schematic illustrating a restored stream 60 of data, according to exemplary embodiments. The presence detection application 18 may continually monitor for the presence of the television 32. When the presence of the multimedia device 16 is redetected, then the presence detection application 18 causes a restoration in the data rate (e.g., bytes per second) of stream 12 of data. The presence detection application 18 sends the restoration message 30 to the server 28, and the restoration message 30 instructs the server-based presence detection application 18 to restore the full-resolution data rate of the stream 12 of data.

FIGS. 2-6 illustrate an example where the electronic device 10 is the set-top box 30 and the multimedia device 16 is the television 32. Either the electronic device 10 or the multimedia device 16, however, as mentioned above, may be any device, such as an analog/digital recorder, CD/DVD player/recorder, audio equipment, receiver, tuner, and/or any other consumer electronic device. Either the electronic device 10 or the multimedia device 16 may also be any computer, peripheral device, camera, modem, storage device, telephone, personal digital assistant, and/or mobile phone. The presence detection application 18, for example, may operate in a computer or server, and the presence detection application 18 degrades the stream 12 of data when the presence of a digital recorder is not detected. If the presence detection application 18 cannot detect presence of video phone capabilities, then the stream 12 of data can be degraded to voice-only portions to reduce bandwidth. If the presence detection application 18 notes a personal digital assistant or a mobile phone does not have the capabilities to support the full-resolution stream 12 of data, then the presence detection application 18 degrades the stream 12 of data to support display, processor, or software constraints. The presence detection application 18, then, may detect the presence of software and hardware capabilities and tailor, degrade, or discard portions of the stream 12 of data to suit those capabilities.

Figure 7:
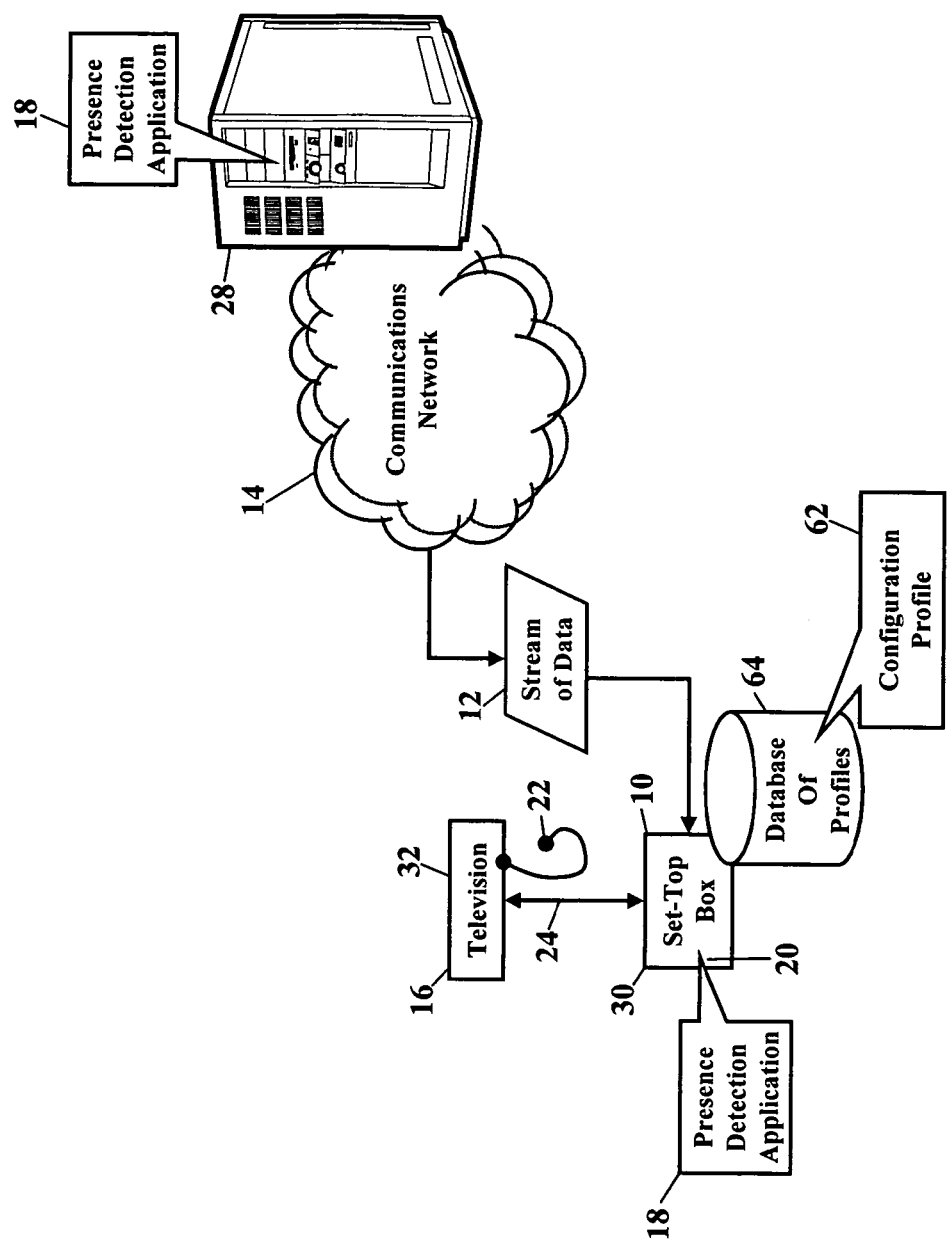
FIG. 7 is a schematic illustrating a degradation profile, according to exemplary embodiments.

FIG. 7 is a schematic illustrating a degradation profile 62, according to exemplary embodiments. Before the presence detection application 18 commands degradation of, or itself degrades, the stream 12 of data to conserve bandwidth, the presence detection application 18 may consult the degradation profile 62. The degradation profile 62 stores preferences when degrading the stream 12 of data. The degradation profile 62 is stored in a database 64 of profiles, and the database 64 is locally or remotely accessible to the electronic device 10 (or to the server 28) via the communications network 14. The degradation profile 62, for example, may store which configuration option (shown as reference numerals 42, 48, 50, and 52 in FIG. 5) is desired by a user. The degradation profile 62 may even store authorization or access parameters, thus restricting what users have privileges to access and change the configuration options.

Figure 8:
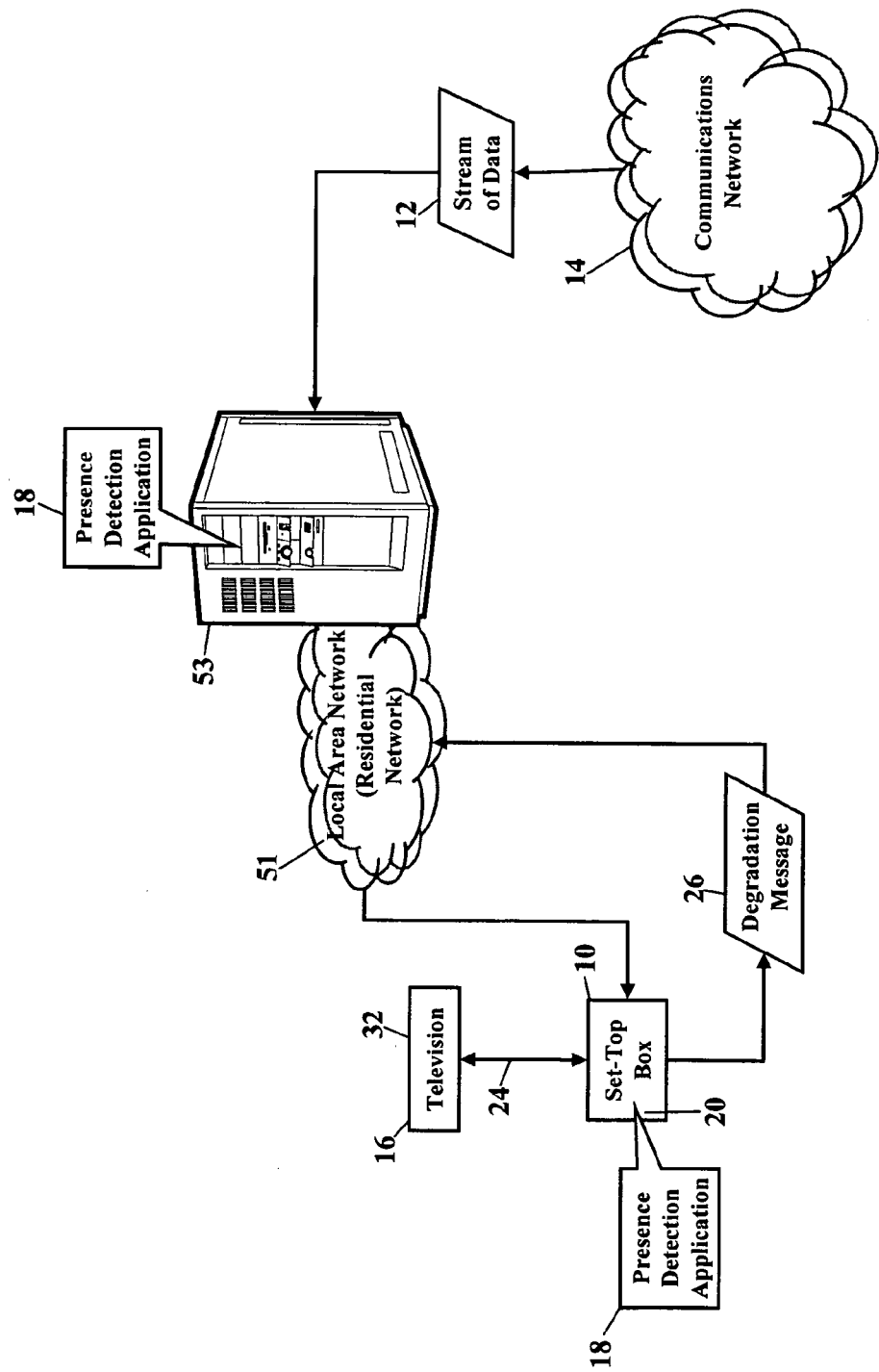
FIG. 8 is a schematic illustrating the presence detection application operating in a local area network (LAN), according to more exemplary embodiments.

FIG. 8 is a schematic illustrating the presence detection application 18 operating in a local area network (LAN) 51, such as a residential network, according to more exemplary embodiments. The presence detection application 18 entirely or partially stores within memory of a residential gateway 53. The residential gateway 53 provides an interface to the broadband communications network 14. When the electronic device 10 (such as the set-top box 20) detects that the multimedia device 16 (such as the television 32) is powered "off" or otherwise not present, the presence detection application 18 enters a low bandwidth state. The electronic device 10 informs the residential gateway 53 that the full-resolution stream 12 of data is not required. The presence detection application 18 operating in the electronic device 10 sends the degradation message 26 to the residential gateway 53. The residential gateway 53 manages sessions for the electronic device 10. The degradation message 26 informs the residential gateway 53 of the low-bandwidth state.

Here the residential gateway 53 "squeezes down" bandwidth. The presence detection application 18 operating in the residential gateway 53 receives the degradation message 26 and "throttles down" the stream 12 of data. That is, the residential gateway 53 receives the full-resolution version of the stream 12 of data, and the presence detection application 18 operating in the residential gateway 53 discards bits to reduce resolution. This solution, then, reduces bandwidth in the residential network 51, but this solution provides little, if any, bandwidth reduction in the broadband communications network 14. That is, the broadband communications network 14 carries and delivers the full-resolution version of the stream 12 of data, and the presence detection application 18 operating in the residential gateway 53 discards bits to reduce resolution. So, if the subscriber's residential network 51 needs to conserve bandwidth, FIG. 8 illustrates an effective solution for local area networks (e.g., the subscriber's residential network).

Figure 9:
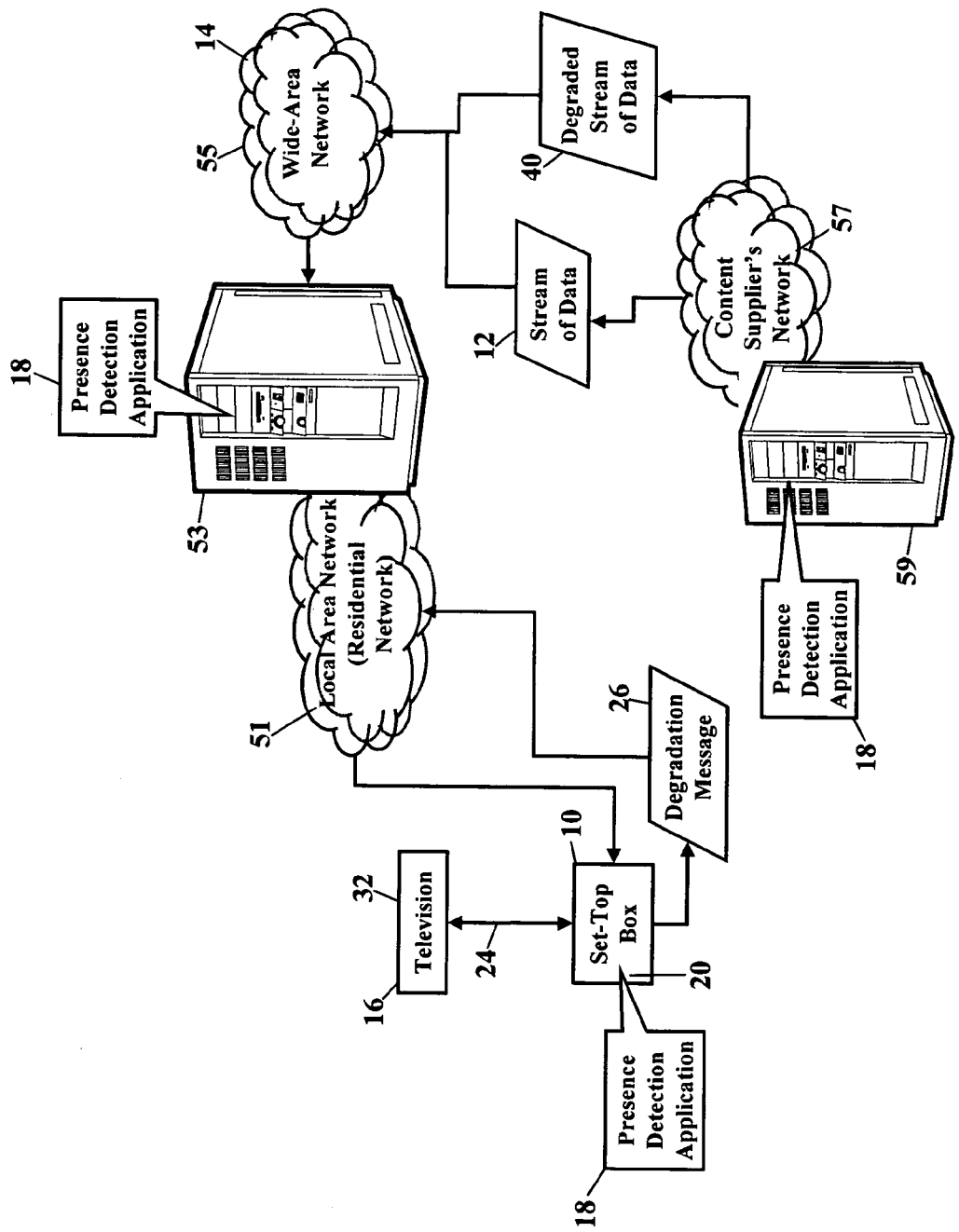
FIG. 9 is a schematic illustrating the presence detection application operating in a wide area network (WAN), according to more exemplary embodiments.

FIG. 9 is a schematic illustrating the presence detection application 18 operating in a wide area network (WAN) 55 (such as the broadband communications network 14), according to more exemplary embodiments. Here, again, the presence detection application 18 entirely or partially stores within memory of the residential gateway 53. A complimentary presence detection application 18 also operates within a content supplier's network 57 (such as within a content server 59). When the electronic device 10 (such as the set-top box 20) detects that the multi-media device 16 (such as the television 32) is powered "off" or otherwise not present, the presence detection application 18 enters the low bandwidth state. The degradation message 26 is sent from the residential network 51 to the content supplier's network 57. The degradation message 26 may originate from the presence detection application 18 operating in the electronic device 10, and/or the degradation message 26 may originate from the presence detection application 18 operating in the residential gateway 53. Regardless, the degradation message 26 routes through the wide area network 55 and informs the content supplier's network 57 of the low-bandwidth state.

Here the content supplier's network 57 reduces bandwidth. The presence detection application 18 operating in the content supplier's network 57 (such as the content server 59) receives the degradation message 26 and reduces the bit rate of the stream 12 of data. That is, the presence detection application 18 operating in the content supplier's network 57 discards bits to reduce resolution. The content supplier's network 57, therefore, begins transmitting the degraded stream 40 of data having a reduced resolution. The degraded stream 40 of data routes through the wide area network 55 to the residential gateway 53. This solution, then, reduces bandwidth in both the wide area network 55 and in the residential network 51. This solution may also reduce bandwidth in the content supplier's network 57.

Figure 10:
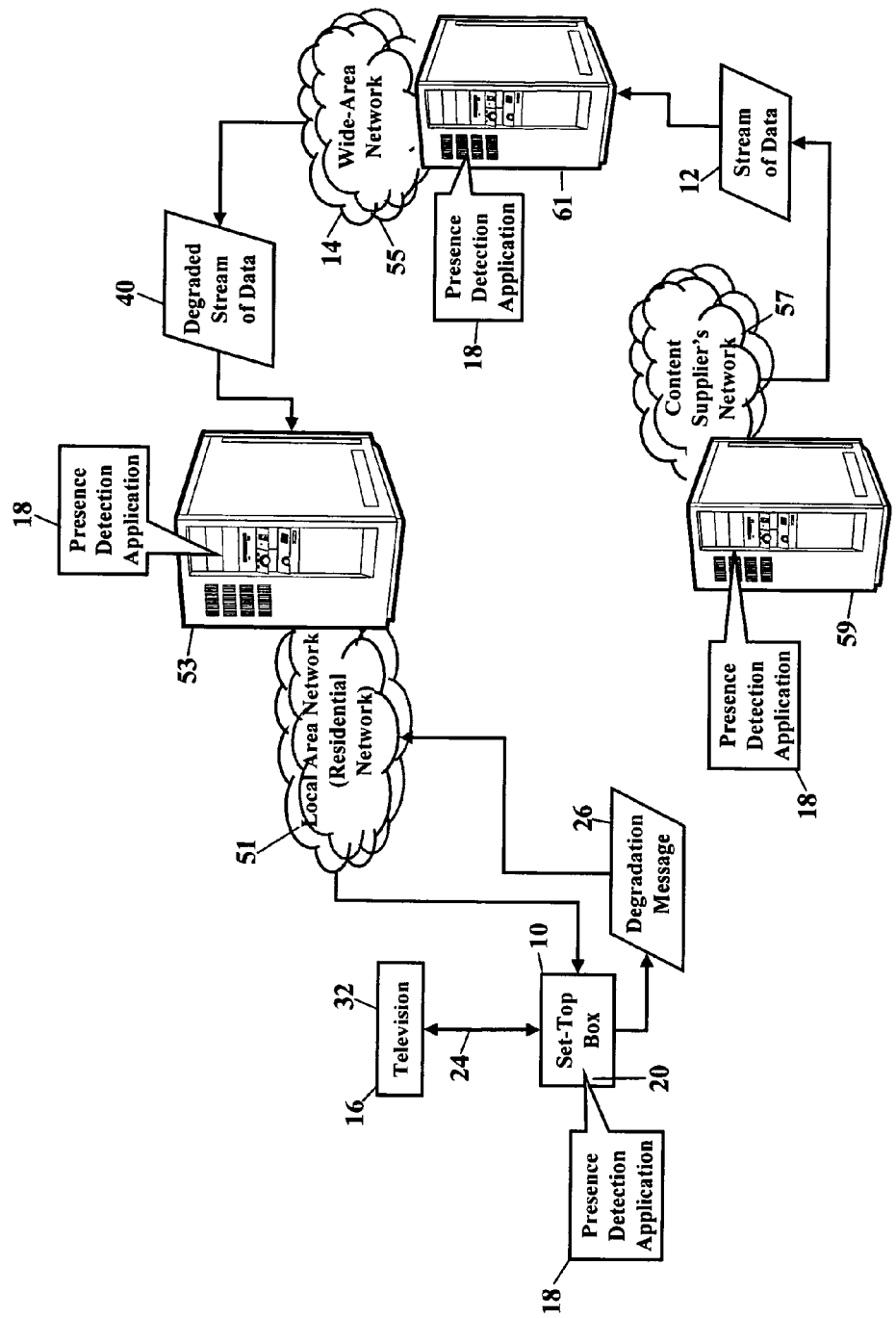
FIGS. 10 and 11 are schematics illustrating the presence detection application operating in a broadband remote access server (BRAS), according to more exemplary embodiments.

FIG. 10 is a schematic illustrating the presence detection application 18 operating in a broadband remote access server (BRAS) 61, according to more exemplary embodiments. The broadband remote access server 61 sets policies for individual users and each user's allowance of bandwidth consumption.

The broadband remote access server 61 also sets policies for individual sessions, regardless of the user. Here, when the low-bandwidth state is detected, a transaction is established with the broadband remote access server 61. When the electronic device 10 (such as the set-top box 20) detects that the multi-media device 16 (such as the television 32) is powered "off" or otherwise not present, the presence detection application 18 enters the low bandwidth state. The degradation message 26 is sent from the residential network 51 to the broadband remote access server 61. The degradation message 26 may originate from the presence detection application 18 operating in the electronic device 10, and/or the degradation message 26 may originate from the presence detection application 18 operating in the residential gateway 53. Regardless, the degradation message 26 routes through the wide area network 55 and informs the broadband remote access server 61 of the low-bandwidth state.

The broadband remote access server 61 may itself reduce bandwidth. A complimentary presence detection application 18 also operates within broadband remote access server 61. When the presence detection application 18 operating in the broadband remote access server 61 receives the degradation message 26, the broadband remote access server 61 itself reduces the bit rate of the stream 12 of data. That is, the presence detection application 18 operating in the broadband remote access server 61 receives the full resolution stream 12 of data and discards bits to reduce the resolution of the session. The broadband remote access server 61, therefore, begins transmitting the degraded stream 40 of data having a reduced resolution. The degraded stream 40 of data routes through the wide area network 55 to the residential gateway 53. This solution, again, reduces bandwidth in both the wide area network 55 and in the residential network 51. This solution, however, fails to reduce bandwidth in the content supplier's network 57.

Figure 11:
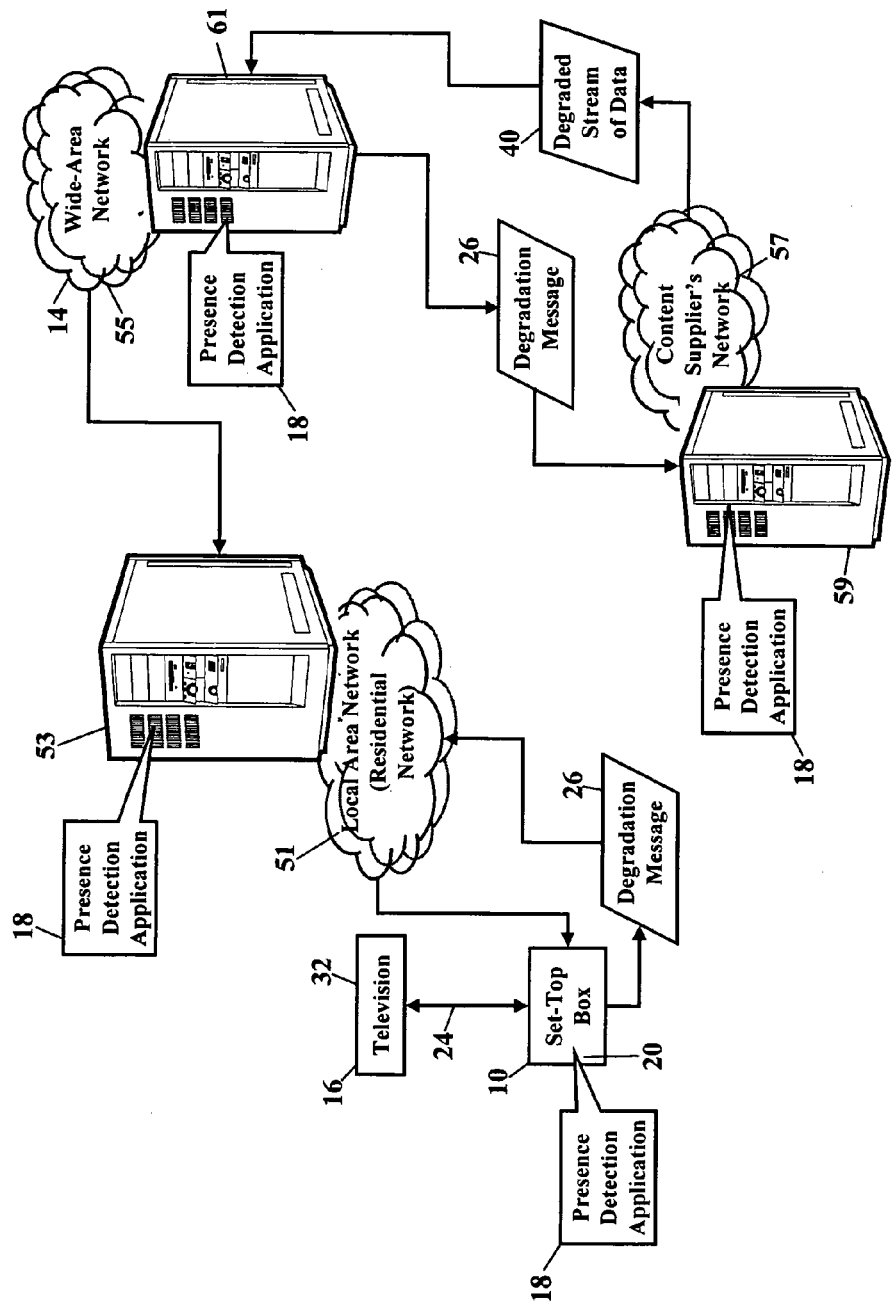

FIG. 11 is a schematic further illustrating the presence detection application 18 operating in a broadband remote access server (BRAS) 61, according to still more exemplary embodiments. FIG. 11 is similar to FIG. 10, although here the content supplier's network 57 is instructed to reduce the resolution of the stream 12 of data. When the electronic device 10 (such as the set-top box 20) detects that the multi-media device 16 (such as the television 32) is powered "off" or otherwise not present, the presence detection application 18 enters the low bandwidth state. The degradation message 26, as before, routes from the residential network 51, through the wide area network 55, and to the broadband remote access server 61. The degradation message 26 informs the broadband remote access server 61 of the low-bandwidth state.

The broadband remote access server 61 then instructs the content supplier's network 57 to reduce the bit rate of the session. The broadband remote access server 61 sends a message to the content supplier's network 57. The message is received by some controller (such as the content server 59). The complimentary presence detection application 18 operating in the content server 59 then discards bits from the stream of data (shown as reference numeral 12 in FIG. 10). The message from the broadband remote access server 61 may be simply a forwarded version of the degradation message 26, as FIG. 11 illustrates. The message from the broadband remote access server 61, however, may take any form and have any protocol. Whatever the form, the message instructs or informs the content server 59 of the low-bandwidth need. The degraded stream 40 of data routes through the wide area network 55 to the residential gateway 53. This solution, then, reduces bandwidth in both the wide area network 55 and in the residential network 51. This solution may also reduce bandwidth in the content supplier's network 57.

Figure 12:
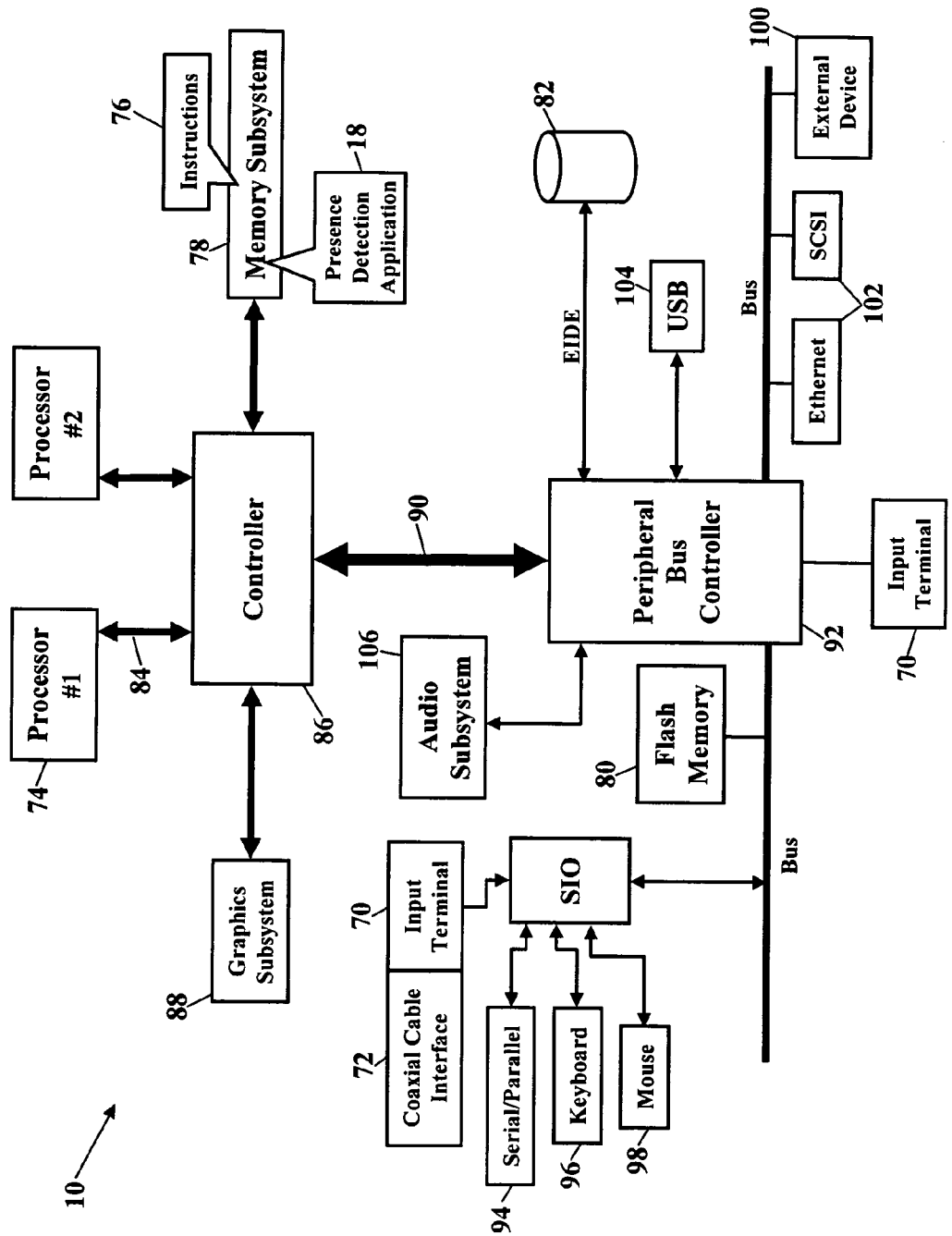
FIG. 12 is a block diagram of exemplary details of the electrical device shown in FIGS. 1-11.

FIG. 12 is a block diagram of exemplary details of the electrical device 10 shown in FIGS. 1-11. The electrical device 10 can be any device, such as an analog/digital recorder, television, CD/DVD player/recorder, audio equipment, receiver, tuner, and/or any other consumer electronic device. The electrical device 10 may also include any computer, peripheral device, camera, modem, storage device, telephone, personal digital assistant, and/or mobile phone. The electrical device 10 may also be configured as a set-top box ("STB") receiver that receives and decodes digital signals. The electrical device 10, in fact, can be any electronic/electrical device that has an input 70 for receiving the stream of data (shown as reference numeral 12 in FIGS. 1-11). The input 70 may include a coaxial cable interface 72 for receiving signals via a coaxial cable (not shown). The input 70 may additionally or alternatively include an interface to a fiber optic line, to a telephone line (such as an RJ-48/56), to other wiring, and to any male/female coupling. The electrical device 10 includes one or more processors 74 executing instructions 76 stored in a system memory device. The instructions 76, for example, are shown residing in a memory subsystem 78. The instructions 76, however, could also reside in flash memory 80 or a peripheral storage device 82. When the processor 74 executes the instructions 76, the processor 74 may also consult the presence detection application 18 stored in the system memory device. The processor 74, however, may additionally or alternatively consult the presence detection application 18 by communicating with the server, operating within the communications network, when conserving bandwidth (the server and the communications network are shown, respectively, as reference numerals 28 and 14 in FIGS. 1-7). The one or more processors 74 may also execute an operating system that controls the internal functions of the electrical device 10. A bus 84 may communicate signals, such as data signals, control signals, and address signals, between the processor 74 and a controller 86. The controller 86 provides a bridging function between the one or more processors 74, any graphics subsystem 88 (if desired), the memory subsystem 78, and, if needed, a peripheral bus 90. The peripheral bus 90 may be controlled by the controller 86, or the peripheral bus 90 may have a separate peripheral bus controller 92. The peripheral bus controller 92 serves as an input/output hub for various ports. These ports include the input terminal 70 and perhaps at least one output terminal. The ports may also include a serial and/or parallel port 94, a keyboard port 96, and a mouse port 98. The ports may also include one or more external device ports 100, networking ports 102 (such as SCSI or Ethernet), and a USB port 104. The electrical device 10 may also include an audio subsystem 106. The electrical device 10 may also include a display device (such as LED, LCD, plasma, or any other) to present instructions, messages, tutorials, and other information to a user. The apparatus 10 may further include one or more encoders, one or more decoders, input/output control, logic, one or more receivers/transmitters/transceivers, one or more clock generators, one or more Ethernet/LAN interfaces, one or more analog-to-digital converters, one or more digital-to-analog converters, one or more "Firewire" interfaces, one or more modem interfaces, and/or one or more PCMCIA interfaces. Those of ordinary skill in the art understand that the program, processes, methods, and systems described herein are not limited to any particular architecture or hardware.

The processors 74 may be implemented with a digital signal processor (DSP) and/or a microprocessor. Advanced Micro Devices, Inc., for example, manufactures a full line of microprocessors (Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Texas Instruments offers a wide variety of digital signal processors (Texas Instruments, Incorporated, P.O. Box 660199, Dallas, Tex. 75266-0199, Phone: 972-995-2011, www.ti.com) as well as Motorola (Motorola, Incorporated, 1303 E. Algonquin Road, Schaumburg, Ill. 60196, Phone 847-5765000, www.motorola.com). There are, in fact, many manufacturers and designers of digital signal processors, microprocessors, controllers, and other componentry that are described in this patent. Those of ordinary skill in the art understand that this componentry may be implemented using any suitable design, architecture, and manufacture. Those of ordinary skill in the art, then understand that the exemplary embodiments are not limited to any particular manufacturer's component, or architecture, or manufacture.

The memory (shown as memory subsystem 78, flash memory 80, or peripheral storage device 82) may also contain an application program. The application program cooperates with the operating system and with a video display device to provide a Graphical User Interface (GUI). The graphical user interface provides a convenient visual and/or audible interface with a user of the electrical device 10.

Figure 13:
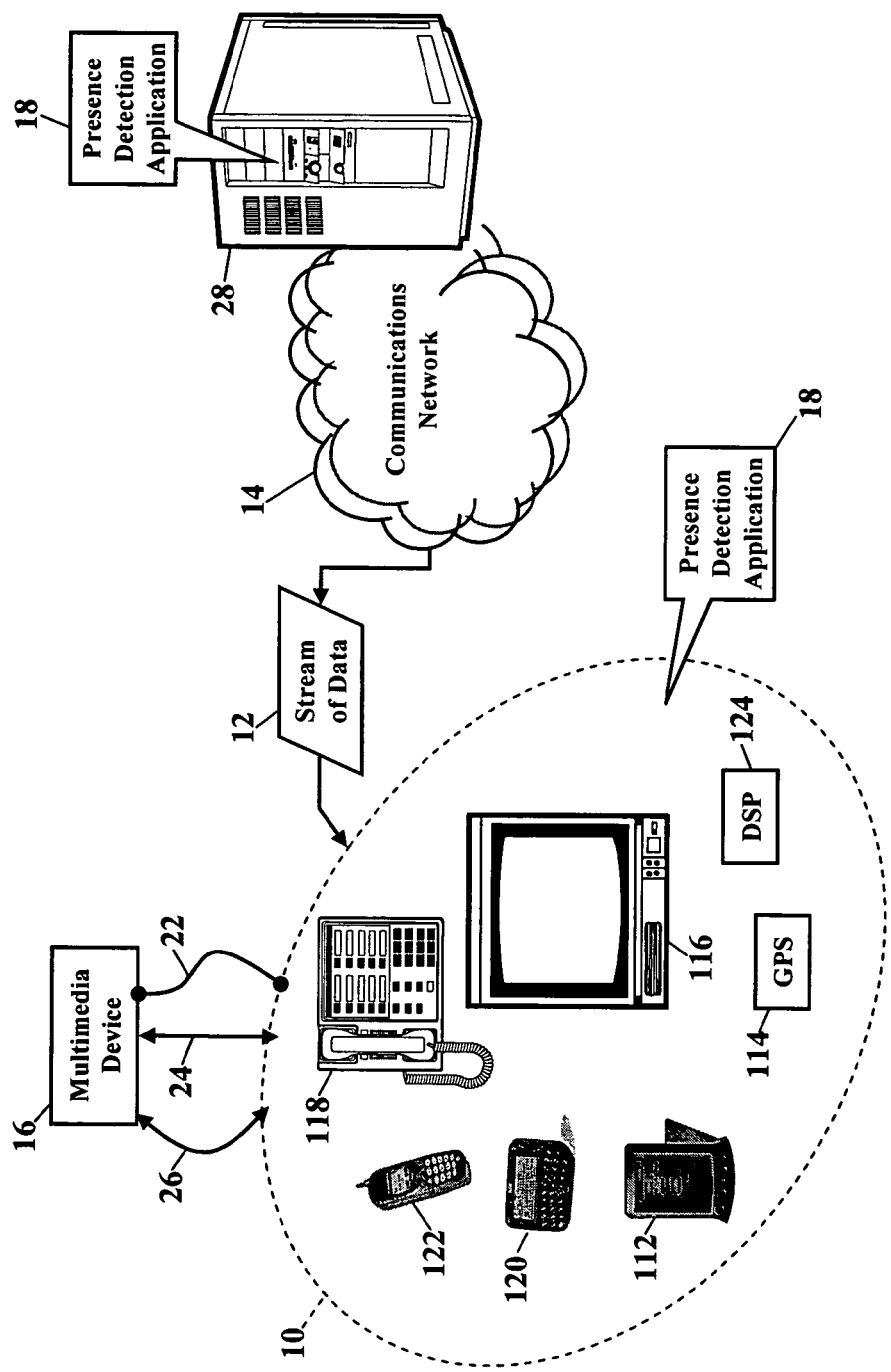
FIG. 13 is a schematic illustrating various types of electronic devices, according to exemplary embodiments.

FIG. 13 is a schematic illustrating still more exemplary embodiments. FIG. 13 illustrates that the electronic device 10 may include various types of devices. The presence detection application 18 operates within any of these various types of devices. FIG. 13, for example, illustrates that the presence detection application 18 may entirely or partially operate within a personal digital assistant (PDA) 112, a Global Positioning System (GPS) device 114, an interactive television 116, an Internet Protocol (IP) phone 118, a pager 120, a cellular/satellite phone 122, or any computer system and/or communications device utilizing a digital signal processor (DSP) 124. The electronic device 10 may also include watches, radios, vehicle electronics, clocks, printers, gateways, and other apparatuses and systems.

Figure 14:
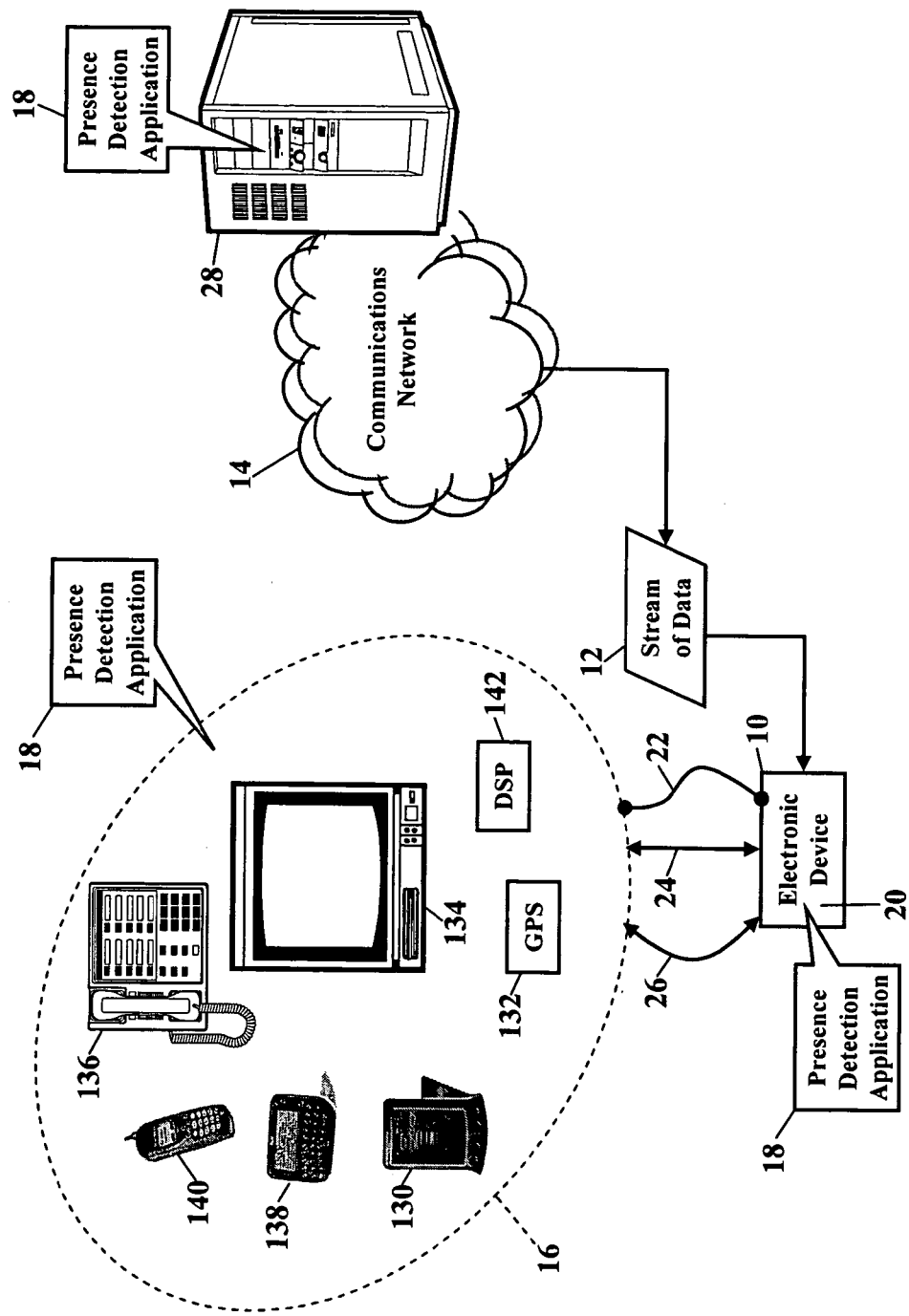
FIG. 14 is a schematic illustrating various types of multimedia devices, according to exemplary embodiments.

FIG. 14 is a schematic illustrating still more exemplary embodiments. FIG. 14 illustrates that the multimedia device 16 may also include various types of devices. FIG. 14 also illustrates that some portions of the presence detection application 18 may operate within any of these various types of devices. The presence detection application 18 may entirely or partially operate within a personal digital assistant (PDA) 130, a Global Positioning System (GPS) device 132, an interactive television 134, an Internet Protocol (IP) phone 136, a pager 138, a cellular/satellite phone 140, or any computer system and/or communications device utilizing a digital signal processor (DSP) 142. The multimedia device 16 may also include watches, radios, vehicle electronics, clocks, printers, gateways, and other apparatuses and systems.

Figure 15:
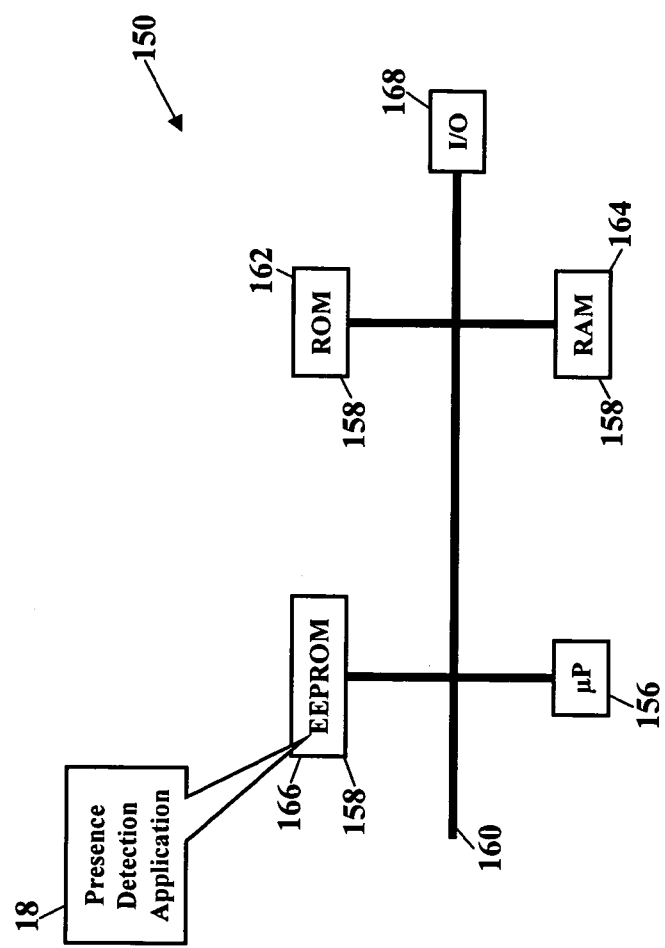
FIGS. 15-17 are schematics further illustrating the electronic device storing the presence detection application, according to exemplary embodiments.
Figure 16:
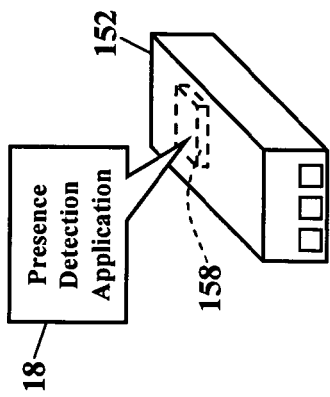
Figure 17:
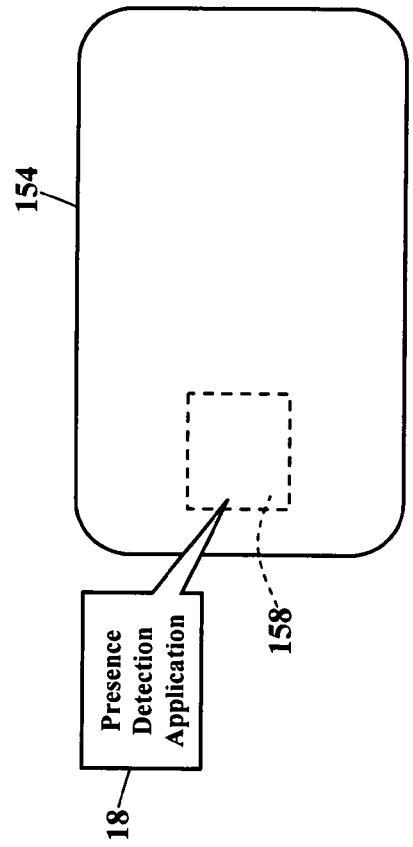

FIGS. 15-17 are schematics further illustrating the electronic device 10 storing the presence detection application 18, according to exemplary embodiments. FIG. 15 is a block diagram of a Subscriber Identity Module 150, while FIGS. 16 and 17 illustrate, respectively, the Subscriber Identity Module 150 embodied in a plug 152 and the Subscriber Identity Module 150 embodied in a card 154. As those of ordinary skill in the art recognize, the Subscriber Identity Module 150 may be used in conjunction with many electronic devices (such as the electronic devices shown in FIG. 13). The Subscriber Identity Module 150 stores user information (such as the user's International Mobile Subscriber Identity, the user's $K_i$ number, and other user information) and any portion of the presence detection application 18. As those of ordinary skill in the art also recognize, the plug 152 and the card 154 each interface with the communications device according to GSM Standards 2.17 and 11.11 and ISO Standard 7816, with each incorporated herein by reference. The GSM Standard 2.17 is formally known as "European digital cellular telecommunications system (Phase 1); Subscriber Identity Modules, Functional Characteristics (GSM 02.17 V3.2.0 (1995-01))." The GSM Standard 11.11 is formally known as "Digital cellular telecommunications system (Phase 2+) (GSM); Specification of the Subscriber Identity Module—Mobile Equipment (Subscriber Identity Module—ME) interface (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "Information technology—Identification cards—Integrated circuit(s) cards with contacts," and the standard is available from the International Organization for Standardization (ISO) (1, rue de Varembe, Case, postale 56CH-1211 Geneva 20, Switzerland, Telephone +41 22 749 01 11, Telefax +41 22 733 34 30, www.iso.org).

FIG. 15 is a block diagram of the Subscriber Identity Module 150, whether embodied as the plug 152 of FIG. 16 or as the card 154 of FIG. 17. Here the Subscriber Identity Module 150 comprises a microprocessor 156 (µP) communicating with memory modules 158 via a data bus 160. The memory modules may include Read Only Memory (ROM) 162, Random Access Memory (RAM) and or flash memory 164, and Electrically Erasable-Programmable Read Only Memory (EEPROM) 166. The Subscriber Identity Module 150 stores some or all of the presence detection application 18 in one or more of the memory modules 158. FIG. 11 shows the presence detection application 18 residing in the Erasable-Programmable Read Only Memory 166, yet the presence detection application 18 could alternatively or additionally reside in the Read Only Memory 162 and/or the Random Access/Flash Memory 164. An Input/Output module 168 handles communication between the Subscriber Identity Module 150 and the electronic device. As those skilled in the art will appreciate, there are many suitable ways for implementing the operation and physical/memory structure of the Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 18:
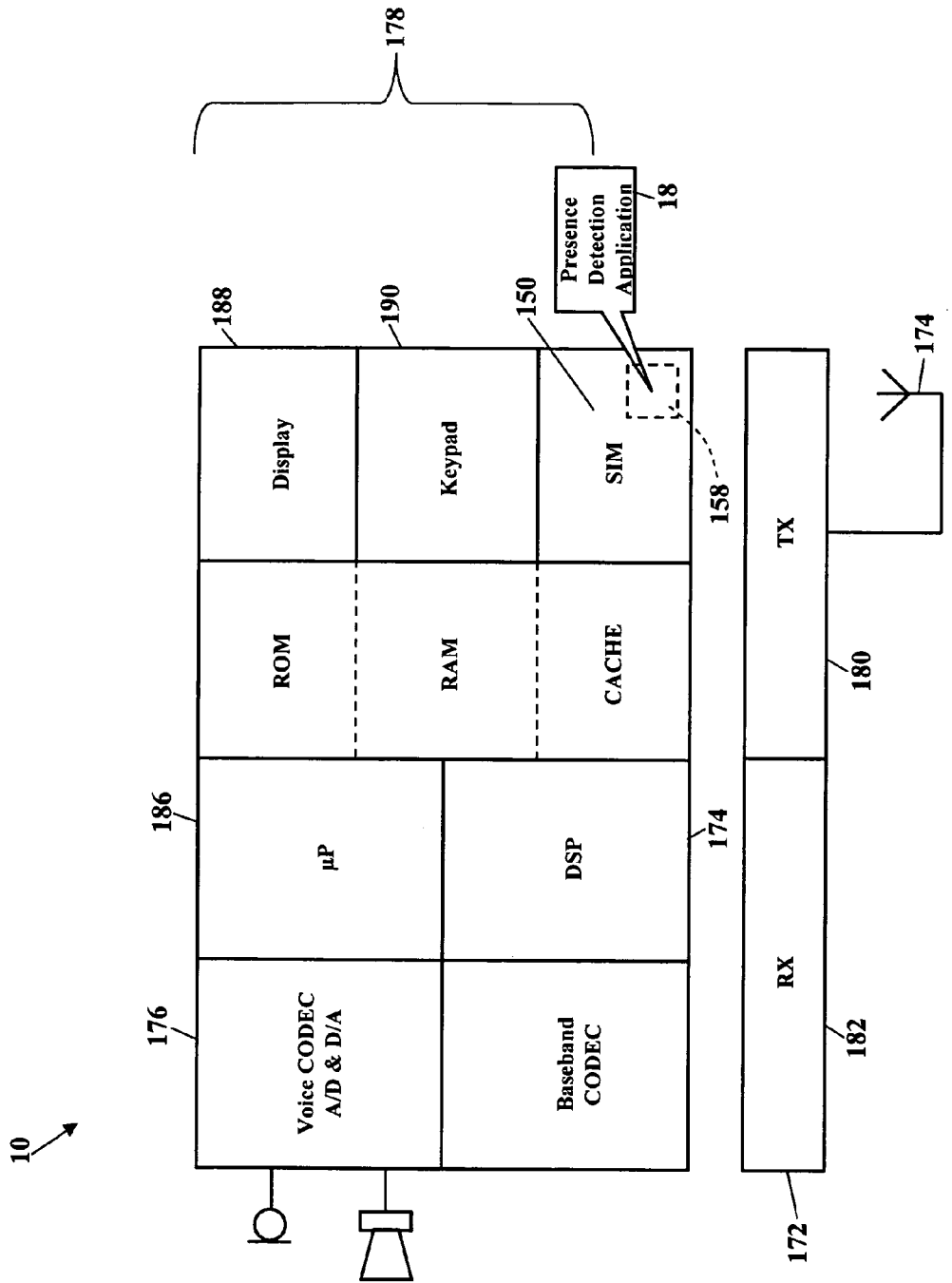
FIG. 18 is a schematic further illustrating the electronic device, according to exemplary embodiments.

FIG. 18 is a schematic further illustrating the electronic device 10, according to exemplary embodiments. FIG. 18 is an alternative block diagram of the electronic device 10 storing the presence detection application 18. Here the electronic device 10 comprises a radio transceiver unit 172, an antenna 174, a digital baseband chipset 176, and a man/machine interface (MMI) 178. The transceiver unit 172 includes transmitter circuitry 180 and receiver circuitry 182 for receiving and transmitting signals. The transceiver unit 172 couples to the antenna 174 for converting electrical current to and from electromagnetic waves. The digital baseband chipset 176 contains a digital signal processor (DSP) 184 and performs signal processing functions for audio (voice) signals and RF signals. As FIG. 14 shows, the digital baseband chipset 176 may also include an on-board microprocessor 186 that interacts with the man/machine interface (MMI) 178. The man/machine interface (MMI) 178 may comprise a display device 188, a keypad 190, and the Subscriber Identity Module 150. The on-board microprocessor 186 performs GSM protocol functions and control functions for the radio circuitry 180 and 182, for the display device 188, and for the keypad 190. The on-board microprocessor 186 may also interface with the Subscriber Identity Module 150 and with the presence detection application 18 residing in the memory module 158 of the Subscriber Identity Module 150. Those skilled in the art will appreciate that there may be many suitable architectural configurations for the elements of the electronic device 10. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

The presence detection application 18 may be utilized regardless of signaling standard. As those of ordinary skill in the art recognize, FIGS. 15-18 illustrate the electronic device 10 utilizing a Global System for Mobile (GSM) standard. That is, the electronic device 10 utilizes the Global System for Mobile (GSM) communications signaling standard. Those of ordinary skill in the art, however, also recognize that the presence detection application 18 may be utilized with the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

Figure 19:
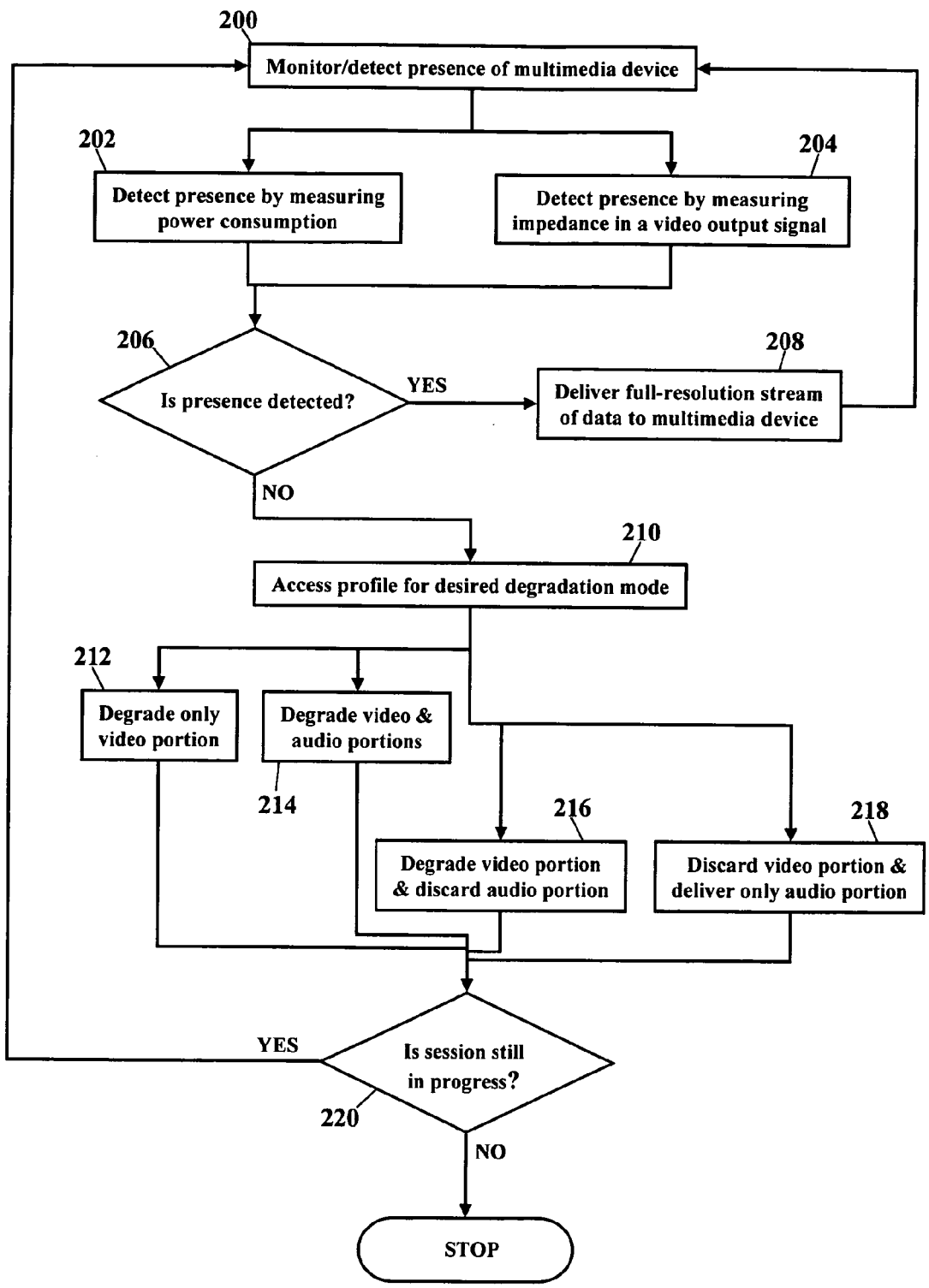
FIG. 19 is a flowchart illustrating a method of conserving bandwidth, according to exemplary embodiments.

FIG. 19 is a flowchart illustrating a method of conserving bandwidth, according to exemplary embodiments. A presence of a multimedia device is monitored or detected (Block 200). Presence may be detected by measuring power consumption of the multimedia device (Block 202) and/or by measuring impedance in a video output signal delivered to the multimedia device (Block 204). If the presence of a multimedia device is detected (Block 206), then a full-resolution stream of data is delivered to the multimedia device (Block 208). If, however, the presence of the multimedia device is not detected (Block 206), then a profile is accessed for a desired degradation mode (Block 210). A video portion of the stream of data may be degraded, and an audio portion of the stream of data is not degraded (Block 212). A video portion and an audio portion of the stream of data may be degraded (Block 214). A video portion of the stream of data may be degraded, and an audio portion of the stream of data may be discarded (Block 216). A video portion may be discarded, thus delivering only an audio portion of the stream of data (Block 218). The method then checks to ensure a session is still in progress (Block 220). If the session remains in progress, then the method resumes monitoring the presence of the multimedia device (Block 200). If, however, the session is no longer in progress (Block 220), then the method ends.

The presence detection application 18 may be physically embodied on or in a computer-readable medium. This computer-readable medium may include CD-ROM, DVD, tape, cassette, floppy disk, memory card, and large-capacity disk (such as IOMEGA®, ZIP®, JAZZ®., and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the embodiments, allow the presence detection application 18 to be easily disseminated. A computer program product for conserving bandwidth comprises the computer-readable medium, and the presence detection application stores on the computer-readable medium. The presence detection application comprises computer code for detecting the presence of a multimedia device. If a presence of a multimedia device is detected, then a stream of data is delivered to the multimedia device. If the presence of the multimedia device is not detected, then the stream of data is degraded to conserve bandwidth.

The presence detection application 18 may also be physically embodied on or in any addressable (e.g., HTTP, IEEE 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method to conserve bandwidth, comprising:
   sending a stream of data to a media device;
   degrading by a processor the stream of data to conserve bandwidth in response to a presence of the media device not being detected;
   storing a user degradation profile in which the user degradation profile instructs how a user desires to degrade the stream of data delivered to the media device from a server in response to the presence of the media device not being detected; and
   consulting the user degradation profile based on the presence of the media device not being detected.

2. The method of claim 1, wherein the user degradation profile causes the server delivering the stream of data to degrade the stream of data before the stream of data reaches the media device.

3. The method of claim 1, wherein a video portion of the stream of data is degraded, and an audio portion of the stream of data is not degraded.

4. The method of claim 1, wherein a video portion and an audio portion of the stream of data are degraded.

5. The method of claim 1, wherein a video portion of the stream of data is degraded, and an audio portion of the stream of data is discarded.

6. The method of claim 1, wherein a video portion of the stream of data is discarded, and only an audio portion of the stream of data is transmitted.

7. The method of claim 1, further comprising before degrading the stream of data to the media device, causing a presence detection application to consult the user degradation profile in response to the presence of the media device not being detected.

8. A system, comprising:
a processor; and
a memory that stores instructions that, when executed by the processor, cause the processor to perform operations comprising:
sending a stream of data to a media device;
degrading the stream of data to conserve bandwidth in response to a presence of the media device not being detected;
storing a user degradation profile in which the user degradation profile instructs how a user desires to degrade the stream of data delivered to the media device from a server in response to the presence of the media device not being detected; and
consulting the user degradation profile based on the presence of the media device not being detected.

9. The system of claim 8, wherein the user degradation profile causes the server delivering the stream of data to degrade the stream of data before the stream of data reaches the media device.

10. The system of claim 8, wherein a video portion of the stream of data is degraded, and an audio portion of the stream of data is not degraded.

11. The system of claim 8, wherein a video portion and an audio portion of the stream of data are degraded.

12. The system of claim 8, wherein a video portion of the stream of data is degraded, and an audio portion of the stream of data is discarded.

13. The system of claim 8, wherein a video portion of the stream of data is discarded, and only an audio portion of the stream of data is transmitted.

14. The system of claim 8, further comprising before degrading the stream of data to the media device, causing a presence detection application to consult the user degradation profile in response to the presence of the media device not being detected.

15. A computer program product embodied in a non-transitory computer readable medium, the computer program product including instructions that, when executed by a processor, cause the processor to perform operations comprising:
sending a stream of data to a media device;
degrading the stream of data to conserve bandwidth in response to a presence of the media device not being detected;
storing a user degradation profile in which the user degradation profile instructs how a user desires to degrade the stream of data delivered to the media device from a server in response to the presence of the media device not being detected; and
consulting the user degradation profile based on the presence of the media device not being detected.

16. The computer program product of claim 15, wherein the user degradation profile causes the server delivering the stream of data to degrade the stream of data before the stream of data reaches the media device.

17. The computer program product of claim 15, wherein a video portion of the stream of data is degraded, and an audio portion of the stream of data is not degraded.

18. The computer program product of claim 15, wherein a video portion and an audio portion of the stream of data are degraded.

19. The computer program product of claim 15, wherein a video portion of the stream of data is degraded, and an audio portion of the stream of data is discarded.

20. The computer program product of claim 15, wherein a video portion of the stream of data is discarded, and only an audio portion of the stream of data is transmitted.

* * * * *